United States Patent
Hayashida et al.

(10) Patent No.: US 9,851,110 B2
(45) Date of Patent: Dec. 26, 2017

(54) HEATING SYSTEM CONTROL METHOD AND HEATING SYSTEM

(75) Inventors: Gaku Hayashida, Osaka (JP); Shinichi Takasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1090 days.

(21) Appl. No.: 13/817,650

(22) PCT Filed: May 17, 2012

(86) PCT No.: PCT/JP2012/003218
§ 371 (c)(1),
(2), (4) Date: Feb. 19, 2013

(87) PCT Pub. No.: WO2013/027312
PCT Pub. Date: Feb. 28, 2013

(65) Prior Publication Data
US 2013/0284818 A1    Oct. 31, 2013

(30) Foreign Application Priority Data
Aug. 24, 2011    (JP) .................. 2011-183031

(51) Int. Cl.
*F24D 15/04*    (2006.01)
*F24D 3/18*    (2006.01)
(Continued)

(52) U.S. Cl.
CPC .............. *F24D 15/04* (2013.01); *F24D 3/18* (2013.01); *F24D 19/1048* (2013.01);
(Continued)

(58) Field of Classification Search
CPC ...................................................... F24D 15/04
See application file for complete search history.

(56) References Cited

U.S. PATENT DOCUMENTS 4,645,908 A * 2/1987 Jones .................. F24D 11/0214
165/240
4,731,547 A * 3/1988 Alenduff .................. H02J 3/48
700/297
(Continued)

FOREIGN PATENT DOCUMENTS

JP    10-038288    2/1998
JP    2000-078748    3/2000
(Continued)

OTHER PUBLICATIONS

U.S. Appl. No. 13/700,886 to Gaku Hayashida, filed Nov. 29, 2012.
(Continued)

*Primary Examiner* — Alissa Tompkins
*Assistant Examiner* — Phillip E Decker
(74) *Attorney, Agent, or Firm* — Greenblum & Bernstein, P.L.C.

(57) ABSTRACT

A method of controlling a heating system includes: obtaining, from a power supply source, information specifying an output modulation period during which power consumption by a heat pump unit is to be reduced; and controlling, based on the information obtained in the obtaining, an amount of heat generated by the heat pump unit. In the controlling, the heat pump unit is caused to generate a first amount of heat per unit time in a period other than the output modulation period, and generate a second amount of heat per unit time during the output modulation period, the second amount of heat being less than the first amount of heat.

19 Claims, 25 Drawing Sheets

(51) Int. Cl.
  *F24D 19/10* (2006.01)
  *G05D 23/19* (2006.01)
  *H02J 3/14* (2006.01)

(52) U.S. Cl.
  CPC ............ *G05D 23/1923* (2013.01); *H02J 3/14* (2013.01); *F24D 2200/08* (2013.01); *F24D 2200/12* (2013.01); *F24D 2220/042* (2013.01); *H02J 2003/143* (2013.01); *Y02B 30/762* (2013.01); *Y02B 70/3225* (2013.01); *Y02B 70/3275* (2013.01); *Y04S 20/222* (2013.01); *Y04S 20/244* (2013.01)

(56) References Cited

U.S. PATENT DOCUMENTS

| | | | | |
|---|---|---|---|---|
| 4,971,136 | A | 11/1990 | Mathur et al. | |
| 5,081,846 | A * | 1/1992 | Dudley | F24D 19/1072 62/115 |
| 5,259,445 | A * | 11/1993 | Pratt | G05D 23/1917 165/241 |
| 5,626,027 | A * | 5/1997 | Dormer | F04B 49/007 236/1 EA |
| 5,924,486 | A * | 7/1999 | Ehlers | F24F 11/006 165/238 |
| 6,254,009 | B1 * | 7/2001 | Proffitt | G05D 23/1905 165/209 |
| 6,467,289 | B2 * | 10/2002 | Kuroki | F24D 19/1054 62/201 |
| 6,480,803 | B1 * | 11/2002 | Pierret | G05D 23/1904 702/130 |
| 6,860,431 | B2 * | 3/2005 | Jayadev | F24F 11/006 236/46 F |
| 6,868,293 | B1 * | 3/2005 | Schurr | G05D 23/1905 700/276 |
| 7,225,629 | B2 * | 6/2007 | Concha | F24D 19/1054 62/181 |
| 7,228,695 | B2 * | 6/2007 | Chida | F24D 17/02 237/8 C |
| 7,364,093 | B2 * | 4/2008 | Garozzo | G05D 23/1905 700/276 |
| 7,528,503 | B2 * | 5/2009 | Rognli | G06Q 30/0207 307/62 |
| 7,849,700 | B2 * | 12/2010 | Seefeldt | F25B 1/10 700/299 |
| 8,185,245 | B2 * | 5/2012 | Amundson | G06Q 10/00 700/277 |
| 8,352,083 | B2 * | 1/2013 | Ng | F24F 11/00 700/276 |
| 8,538,586 | B2 * | 9/2013 | Amundson | F24F 11/0012 700/276 |
| 8,919,659 | B2 * | 12/2014 | Takasaki | F24D 19/1039 237/2 A |
| 9,244,445 | B2 * | 1/2016 | Finch | G05B 15/02 |
| 9,261,284 | B2 * | 2/2016 | Hayashida | F24D 17/02 |
| 9,267,719 | B2 * | 2/2016 | Hayashida | F25B 27/002 |
| 9,494,373 | B2 * | 11/2016 | Hayashida | F28F 27/00 |
| 9,677,784 | B2 * | 6/2017 | Hayashida | F24H 9/2021 |
| 9,677,809 | B1 * | 6/2017 | Eustis | F25D 31/002 |
| 2005/0005621 | A1 | 1/2005 | Jayadev | |
| 2006/0065750 | A1 * | 3/2006 | Fairless | F23N 5/203 236/46 R |
| 2010/0004790 | A1 * | 1/2010 | Harbin, III | F24D 19/1051 700/291 |
| 2012/0029725 | A1 * | 2/2012 | Lafleur | F24F 11/0086 700/300 |
| 2012/0152514 | A1 * | 6/2012 | Takasaki | F24D 19/1039 237/8 A |
| 2012/0180506 | A1 * | 7/2012 | Ochiai | F25B 49/005 62/126 |
| 2013/0140015 | A1 * | 6/2013 | Hayashida | F28F 27/00 165/200 |
| 2013/0205814 | A1 * | 8/2013 | Hayashida | F24H 4/04 62/115 |

FOREIGN PATENT DOCUMENTS

| | | |
|---|---|---|
| JP | 2001-124349 | 5/2001 |
| JP | 2002-044883 | 2/2002 |
| JP | 2002-171673 | 6/2002 |
| JP | 2006-234231 | 9/2006 |
| JP | 2007-132539 | 5/2007 |
| JP | 2009-036473 | 2/2009 |
| JP | 2010-164199 | 7/2010 |

OTHER PUBLICATIONS

U.S. Appl. No. 13/701,103 to Gaku Hayashida, filed Nov. 30, 2012.
U.S. Appl. No. 13/701,141 to Gaku Hayashida, filed Nov. 30, 2012.
European Search report in European Patent Application No. 12823186.7, dated Jan. 30, 2015.
Office Action, dated Mar. 1, 2016, in corresponding Japanese patent application No. 2012-552585.

* cited by examiner

FIG. 7

Outlet heated water temperature settings table

| Input information | Outside temperature (°C) | -20 | -15 | -10 | -5 | ... |
|---|---|---|---|---|---|---|
| Output information | Outlet heated water temperature (°C) | 45 | 43 | 41 | 39 | ... |

FIG. 12

Outlet heated water temperature settings table

| | | | | | | | |
|---|---|---|---|---|---|---|---|
| OM time: 1 hr<br>Home build year: 2000 | Input information | Outside temperature (°C) | -20 | -15 | -10 | -5 | ... |
| | Output information | Outlet heated water temperature (°C) | 35 | 34 | 33 | 32 | ... |
| OM time: 2 hrs<br>Home build year: 2000 | Input information | Outside temperature (°C) | -20 | -15 | -10 | -5 | ... |
| | Output information | Outlet heated water temperature (°C) | 40 | 38 | 37 | 34 | ... |
| OM time: 2 hrs<br>Home build year: 2005 | Input information | Outside temperature (°C) | -20 | -15 | -10 | -5 | ... |
| | Output information | Outlet heated water temperature (°C) | 39 | 37 | 35 | 33 | ... |

...

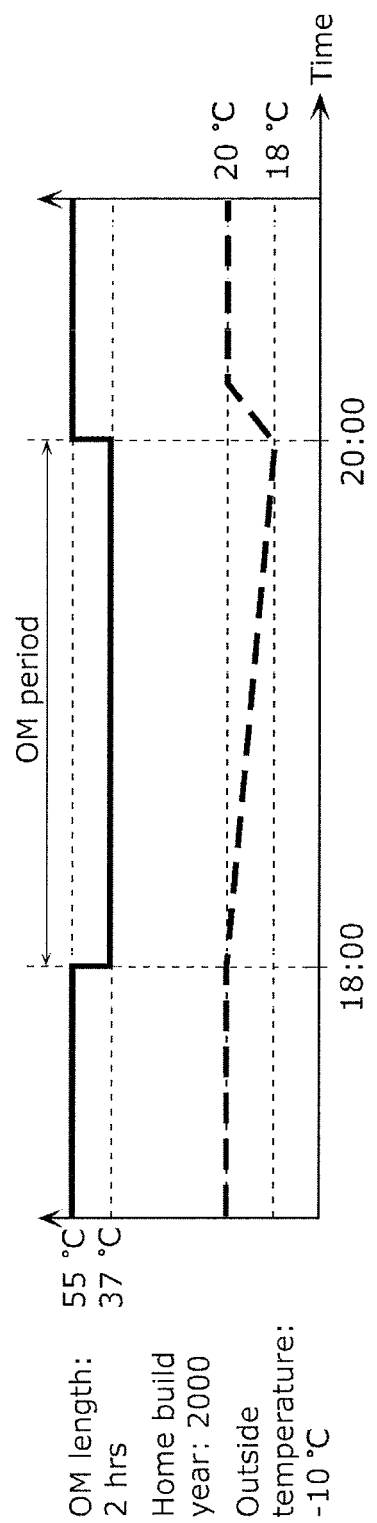

| | | | | | | | |
|---|---|---|---|---|---|---|---|
| Input information | Outside temperature (°C) | -20 | -20 | -20 | -20 | | ... |
| | OM time (hr) | 2 | 2 | 2 | 2 | | ... |
| | Outlet heated water temperature (°C) | 35 | 40 | 45 | 50 | | ... |
| Output information | Sensible temperature (°C) | 10.0 | 10.3 | 10.6 | 11.0 | | ... |
| | Power consumption (W) | 3000 | 3100 | 3250 | 3400 | | ... |

HEATING SYSTEM CONTROL METHOD AND HEATING SYSTEM

TECHNICAL FIELD

The present invention is related to heating system control methods, and in particular to a control method for a heating system including a heat pump heating device.

BACKGROUND ART

A heat pump hot water supply device heats a refrigerant by absorbing heat from the atmosphere and compressing the refrigerant using electricity. The heat is then transferred to the water via a heat exchanger, creating hot water. The heat pump hot water supply device uses less energy than a conventional electric hot water heater. Moreover, the heat pump heating device is an energy saving heating device that uses water heated by the heat pump for the heater.

For example, Patent Literature (PTL) 1 discloses an arrangement for a low cost supply of power by a power company (hot time 22). Customers participating in this arrangement can use power under a fee structure that is cheaper than the usual rate in exchange for their power being cut off during a peak power consumption time period (for example, 19:00 to 22:00). Moreover, this arrangement is beneficial to the power company as well since the supply of power during the peak time period can be reduced and equalized.

CITATION LIST

Patent Literature

[PTL 1] Japanese Unexamined Patent Application Publication No. 2006-234231

SUMMARY OF INVENTION

Technical Problem

Although the method described above allows for low-cost use of power, thermal comfort is sacrificed, particularly in winter, since a heating unit cannot be used during the peak time period.

Moreover, it is conceivable to operate the heat pump at maximum capacity to accumulate heat in the home before the power cut-off time period begins. However, in doing so, the room temperature rapidly increases in a short span of time, then rapidly decreases. In other words, comfort in the room is sacrificed since the room temperature sharply increases and decreases in a short span of time.

Thus, in order to solve the above-mentioned problem, the present invention aims to provide a heating system control method which can reduce the consumption of power during the power consumption peak time period without sacrificing comfort.

Solution to Problem

The method of controlling a heating system according to an aspect of the present invention is a method of controlling a heating system that operates using power supplied from a power supply source. The heating system includes: a heat pump unit that generates heat using the power supplied from the power supply source; and a radiator unit that radiates the heat generated by the heat pump unit. The method of controlling the heating system includes: obtaining, from the power supply source, information specifying an output modulation period during which power consumption by the heat pump unit is to be reduced; and controlling, based on the information obtained in the obtaining, an amount of the heat generated by the heat pump unit. In the controlling, the heat pump unit is caused to: generate a first amount of heat per unit time in a period other than the output modulation period; and generate a second amount of heat per unit time during the output modulation period, the second amount of heat being less than the first amount of heat.

It is to be noted that general or specific embodiments may be realized as a system, method, integrated circuit, computer program, storage media, or any elective combination thereof.

Advantageous Effects of Invention

With the present invention, peak time power consumption can be cut and user comfort can be maintained by reducing the amount of heat generated per unit time by the heat pump during an output modulation period (hereinafter also referred to as OM period).

BRIEF DESCRIPTION OF DRAWINGS

FIG. 7 is an example of an outlet heated water temperature settings table according to the first embodiment.

FIG. 12 is an example of an outlet heated water temperature settings table according to the second embodiment.

FIG. 13B shows another example of a shift in outlet heated water temperature and room temperature according to the second embodiment.

DESCRIPTION OF EMBODIMENTS

Figure 1:
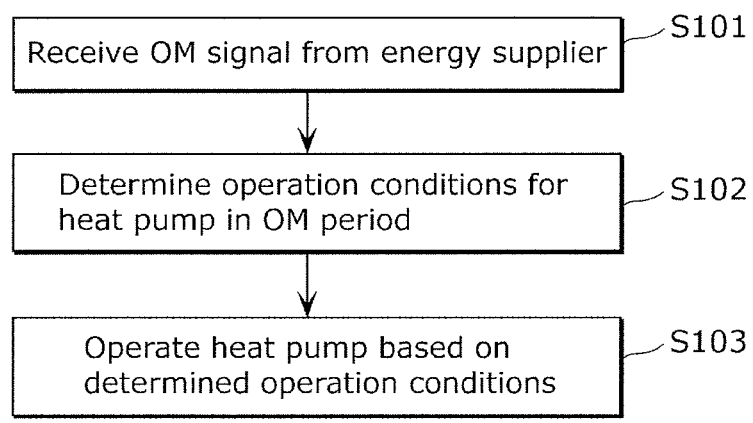
FIG. 1 is a flow chart outlining the processes performed by the heat pump heating system according to the first embodiment.

The method of controlling a heating system according to an aspect of the present invention is a method of controlling a heating system that operates using power supplied from a power supply source. The heating system includes: a heat pump unit that generates heat using the power supplied from the power supply source; and a radiator unit that radiates the heat generated by the heat pump unit. The method of controlling the heating system includes: obtaining, from the power supply source, information specifying an output modulation period during which power consumption by the heat pump unit is to be reduced; and controlling, based on the information obtained in the obtaining, an amount of the heat generated by the heat pump unit. In the controlling, the heat pump unit is caused to: generate a first amount of heat per unit time in a period other than the output modulation period; and generate a second amount of heat per unit time during the output modulation period, the second amount of heat being less than the first amount of heat.

With the above configuration, power consumption can be cut in the peak time period by reducing the amount of heat generated per unit time by the heat pump unit during the output modulation period. It is to be noted that the heat pump unit is kept from completely shutting off by setting the second amount of heat to be a value larger than 0 (W). Consequently, the comfort of the user is kept from being excessively sacrificed. In other words, power consumption is reduced while maintaining a high level of comfort.

Moreover, the heat pump unit may heat water flowing therein with the generated heat, and may output the heated water. In the controlling, the heat pump unit may be caused to: output heated water of a first temperature in a period other than the output modulation period; and output heated water of a second temperature during the output modulation period, the second temperature being lower than the first temperature.

With this, the amount of heat generated per unit time by the heat pump unit can be reduced. It is to be noted that the amount of heated water output by the heat pump unit may be reduced.

Furthermore, the heating system may include association information in which an outside temperature and the second temperature are associated to prevent a temperature of a room in which the radiator unit is installed from dropping below a predetermined minimum temperature during the output modulation period. An outside temperature may be obtained in the obtaining. In the controlling, one of the second temperatures which corresponds to the outside temperature obtained in the obtaining may be selected from the association information.

Furthermore, the heating system may include association information in which an outside temperature, a length of the output modulation period, a thermal insulation efficiency of a building in which the heating system is installed, and the second temperature are associated to keep a decrease in temperature of a room in which the radiator unit is installed to within a predetermined range during the output modulation period. An outside temperature may be obtained in the obtaining. In the controlling, one of the second temperatures which corresponds to the outside temperature obtained in the obtaining, the length of the output modulation period obtained in the obtaining, and the thermal insulation efficiency of the building in which the heating system is installed may be selected from the association information, the thermal insulation efficiency being set in advance.

Furthermore, in the obtaining, a degree of reduction may be obtained from the power supply source, the degree of reduction indicating a degree of reduction in power consumption during the output modulation period. In the controlling, the selected second temperature may further be corrected based on the degree of reduction obtained in the obtaining.

As an example, in the controlling, the selected second temperature may be corrected to a lower value when the degree of reduction obtained in the obtaining is greater than a predetermined criterion, and the selected second temperature may be corrected to a higher value when the degree of reduction obtained in the obtaining is less than a predetermined criterion.

In this way, a high level of comfort can be more adequately maintained and the power consumption can be more adequately reduced as a result of the second temperature being corrected in accordance with information indicating a degree of reduction in power consumption.

Furthermore, the heating system may include information associating combinations of the second temperature and the power consumption with an outside temperature, and may hold the information. An outside temperature may be further obtained in the obtaining. In the controlling, a comfort rating and a power consumption rating may be calculated for each of the combinations of the second temperature and the power consumption associated with the outside temperature obtained in the obtaining, the comfort rating increasing with the second temperature and the power consumption rating increasing with a decrease in the power consumption, and the second temperature having a highest overall rating may be selected, the highest overall rating being a sum of the comfort rating and the power consumption rating.

With this, a high level of comfort and reduction of the power consumption can be achieved in a balanced manner by selecting the outlet heated water temperature having the highest overall rating, which is a sum of the comfort rating and the power consumption rating.

Furthermore, in the obtaining, an inlet water temperature and an outlet heated water temperature may be detected on a per unit time basis, the inlet water temperature being a temperature of the water flowing into the heat pump unit and the outlet heated water temperature being a temperature of the heated water exiting the heat pump unit. In the controlling, the temperature of the heated water exiting the heat pump unit may be reduced from the first temperature to the second temperature by causing the temperature of the heated water exiting the heat pump unit to reduce by a given amount of variation each time a difference between the outlet heated water temperature and the inlet water temperature exceeds a threshold.

In this way, the heat pump unit can be kept from completely shutting off and the outlet heated water temperature can be reduced from the first temperature to the second temperature by gradually reducing the outlet heated water temperature while checking the difference in temperature between the outlet heated water temperature and the inlet water temperature.

Furthermore, in the obtaining, a room temperature of a room in which the radiator unit is installed may be detected on a per unit time basis. In the controlling, a temperature of the heated water exiting the heat pump unit may be reduced by a first amount of variation when a unit time decrease in the room temperature obtained in the obtaining is less than or equal to a first threshold.

In this way, by gradually reducing the outlet heated water temperature while monitoring the amount of decrease in room temperature per unit time, the outlet heated water temperature can be returned to a value equal to a value when the amount of decrease in room temperature increases. That is to say, the outlet heated water temperature can be adequately adjusted based on an actual comfort level without predetermining the second temperature.

Furthermore, in the controlling, the temperature of the heated water exiting the heat pump unit may be increased by a second amount of variation when the unit time decrease in the room temperature obtained in the obtaining exceeds a second threshold, the second amount of variation being less than the first amount of variation and the second threshold being greater than or equal to the first threshold.

Furthermore, in the controlling, the temperature of the heated water exiting the heat pump unit may be maintained when the unit time decrease in the room temperature obtained in the obtaining exceeds the first threshold and is less than or equal to the second threshold.

Furthermore, the heating system may include a heater that, when a temperature of heated water exiting the heat pump unit drops below a first temperature, heats the heated water to the first temperature. In the controlling, operation of the heater may be permitted in a period other than the output modulation period, and operation of the heater may be restricted during the output modulation period.

While comfort is slightly sacrificed by preventing the heater, the power consumption of which is relatively high, from operating during the output modulation period, power consumption can be effectively reduced.

The heating system according to an aspect of the present invention operates using power supplied from a power supply source. Specifically, the heating system includes: a heat pump unit configured to generate heat using power supplied from the power supply source; a radiator unit configured to radiate the heat generated by the heat pump unit; an obtaining unit configured to obtain, from the power supply source, information specifying an output modulation period during which power consumption by the heat pump unit is to be reduced; and an operation control unit configured to control, based on the information obtained by the obtaining unit, the amount of the heat generated by the heat pump unit. The operation control unit is configured to cause the heat pump unit to: generate a first amount of heat per unit time in a period other than the output modulation period; and generate a second amount of heat per unit time during the output modulation period, the second amount of heat being less than the first amount of heat.

Moreover, the heat pump unit may be configured to heat water flowing therein with the generated heat, and output the heated water. The operation control unit may be configured to cause the heat pump unit to: output heated water of a first temperature in a period other than the output modulation period; and output heated water of a second temperature during the output modulation period, the second temperature being lower than the first temperature.

Furthermore, the heating system may include: an outside temperature detecting unit configured to detect an outside temperature; and a memory unit configured to hold association information in which the outside temperature and the second temperature are associated to prevent a temperature of a room in which the radiator unit is installed from dropping below a predetermined minimum temperature during the output modulation period. The operation control unit may be configured to select, from the association information held in the memory unit, one of the second temperatures which corresponds to the outside temperature detected by the outside temperature detecting unit.

Furthermore, the heating system may include: a memory unit configured to hold association information in which the outside temperature, a length of the output modulation period, a thermal insulation efficiency of a building in which the heating system is installed, and the second temperature are associated to keep a decrease in temperature of a room in which the radiator unit is installed to within a predetermined range during the output modulation period. The operation control unit may be configured to select, from the association information held in the memory unit, one of the second temperatures which corresponds to (i) the outside temperature detected by the outside temperature detecting unit, (ii) the length of the output modulation period obtained by the obtaining unit, and (iii) the thermal insulation efficiency of the building in which the heating system is installed, the thermal insulation efficiency being set in advance.

Furthermore, the heating system may include: an outside temperature detecting unit configured to detect an outside temperature; and a memory unit configured to hold information associating combinations of the second temperature and the power consumption with an outside temperature. The operation control unit may be configured to: calculate a comfort rating and a power consumption rating for each of the combinations of the second temperature and the power consumption associated with the outside temperature detected by the outside temperature detecting unit, the comfort rating increasing with the second temperature and the power consumption rating increasing with a decrease in the power consumption; and select the second temperature having a highest overall rating, the highest overall rating being a sum of the comfort rating and the power consumption rating.

Furthermore, the heating system may include: an inlet water temperature detecting unit configured to detect an inlet water temperature on a per unit time basis, the inlet water temperature being a temperature of the water flowing into the heat pump unit; and an outlet heated water temperature detecting unit configured to detect an outlet heated water temperature on a per unit time basis, the outlet heated water temperature being a temperature of the heated water exiting the heat pump unit. The operation control unit may be configured to reduce the temperature of the heated water exiting the heat pump unit from the first temperature to the second temperature by causing the temperature of the heated water exiting the heat pump unit to reduce by a given amount of variation each time a difference between the outlet heated water temperature and the inlet water temperature exceeds a threshold.

Furthermore, the heating system may include a room temperature detecting unit configured to detect a room temperature of a room in which the radiator unit is installed on a per unit time basis. The operation control unit may be configured to reduce a temperature of the heated water exiting the heat pump unit (101, 102) by a first amount of variation when a unit time decrease in the room temperature detected by the room temperature detecting unit is less than or equal to a first threshold.

Furthermore, the operation control unit may be configured to increase the temperature of the heated water exiting the heat pump unit by a second amount of variation when the unit time decrease in the room temperature detected by the room temperature detecting unit exceeds a second threshold, the second amount of variation being less than the first amount of variation and the second threshold being greater than or equal to the first threshold Moreover, the heating system may include: a heating device including the heat pump unit, the radiator unit, and a heat pump (HP) control unit that is configured to control the heat pump unit according to a control of the operation control unit; and the heating system control unit which is structurally separate from the heating device and includes the obtaining unit and the operation control unit.

It is to be noted that general or specific embodiments may be realized as a system, method, integrated circuit, computer program, storage media, or any elective combination thereof.

Hereinafter, embodiments of present invention are described with reference to the drawings. It is to be noted that each of the embodiments described below shows a specific example of the present invention. The numerical values, shapes, materials, structural elements, the arrangement and connection of the structural elements, steps, the processing order of the steps etc. shown in the following exemplary embodiments are mere examples, and therefore do not limit the present invention. Moreover, among the structural elements in the following exemplary embodiments, structural elements not recited in any one of the independent claims defining the most generic part of the inventive concept are described as arbitrary structural elements.

[First Embodiment]

First, processes performed by the heat pump heating system according to the first embodiment of the present invention will be outlined with reference to FIG. 1. FIG. 1 is a flow chart outlining the processes performed by the heat pump heating system according to the first embodiment.

As FIG. 1 shows, the heat pump heating system according to the first embodiment first receives an output modulation signal (hereinafter also referred to as OM signal) from the energy supplier (S101). The OM signal includes information specifying an output modulation period (OM period) which is a time period during which power consumption by the heat pump should be reduced. The output modulation period is a period arbitrarily designated by the energy supplier. The period can be, for example, a peak time of power supply by the energy supplier, such as a two hour period between 18:00 and 20:00.

Next, the heat pump heating system determines heat pump operation conditions for the OM period (S102). Specifically, operation conditions that cause the heat pump to generate an amount of heat per unit time (second amount of heat: 3 kW, for example) that is less than an amount of heat generated per unit time by the heat pump in a period other than the OM period (first amount of heat: 9 kW, for example) are determined.

The heat pump heating system then operates the heat pump based on the set conditions determined in step S102 until the end of the OM period (S103).

With the above configuration, power consumption can be cut in the peak time period by reducing the amount of heat generated per unit time by the heat pump unit during the OM period. Here, the second amount of heat is set to a value that will not cause user comfort to be excessively sacrificed. This allows for power consumption to be cut in the peak time period and the comfort of the user to be maintained. Furthermore, since the heat pump is not completely shut off during the OM period, the amount of heat generated can be brought back up to the original state (the first amount of heat) immediately after the end of the OM period.

Figure 2:
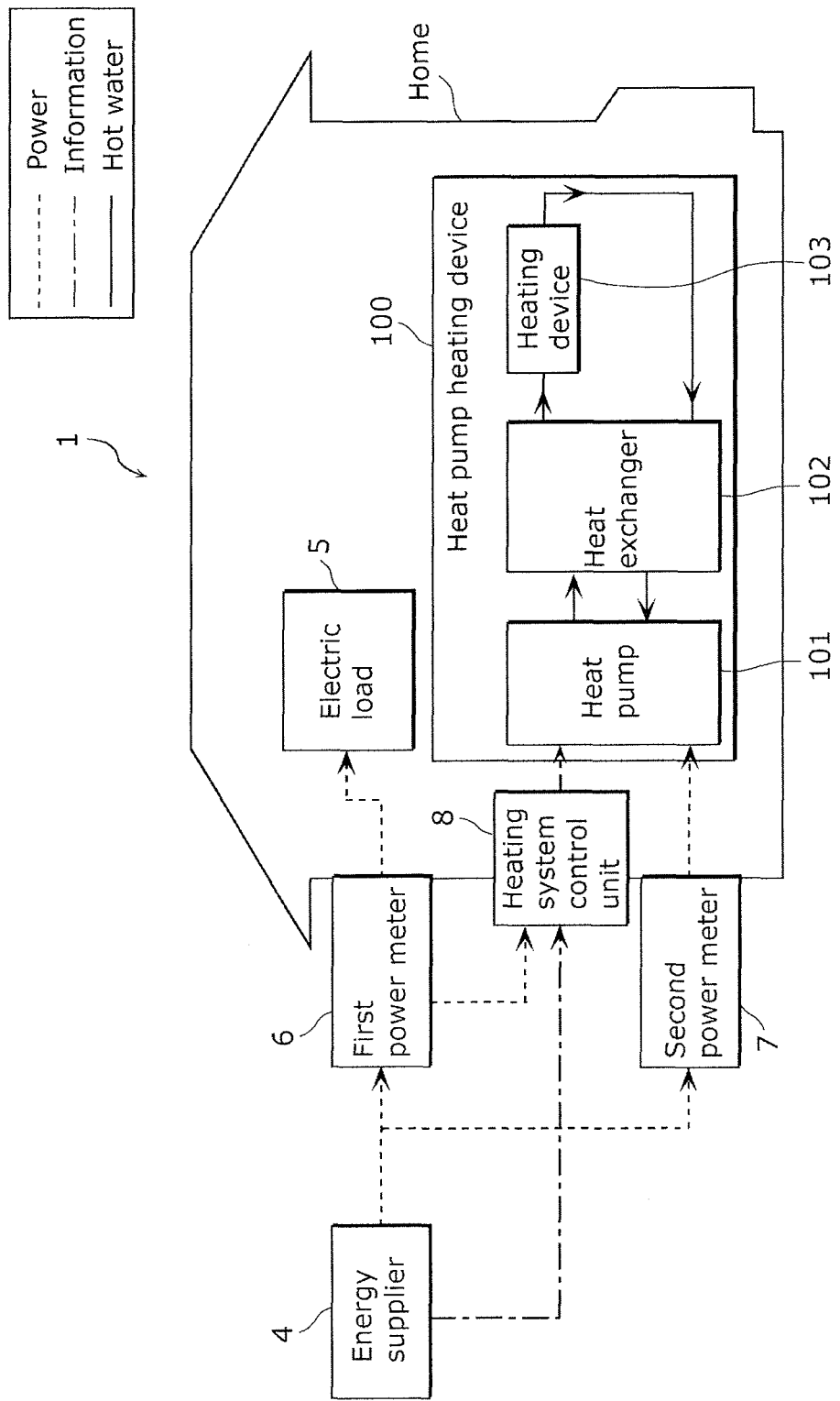
FIG. 2 is a diagram showing the heat pump heating system according to the first embodiment.

FIG. 2 shows the heat pump heating system according to the first embodiment. In the example shown in FIG. 2, power is delivered to a home (building) from an energy supplier (power supply source) 4 via a first and second power grid. The first power grid is a network that provides a stable supply of power. Moreover, the first power grid is a power grid having a relatively high electrical utility rate, and the amount of power consumed from the first power grid is measured by a first power meter 6. On the other hand, the second power grid is a power grid through which the energy supplier 4 can reduce the supply of power for a given time period. Moreover, the second power grid is a power grid having an electrical utility rate that is lower than that of the first power grid, and the amount of power consumed from the second power grid is measured by a second power meter 7.

Moreover, an electric load 5, a heating system control unit 8, and a heat pump heating device 100 are installed inside the home shown in FIG. 1. The heat pump heating device 100 includes at least a heat pump (heat generation unit) 101, a heat exchanger 102, and a heating device (radiator unit) 103.

The heat pump heating device 100 is a device which, by radiating the heat generated by the heat pump 101 from the heating device 103 using the heat exchanger 102, maintains the temperature of a room in which the heating device 103 is installed to within a predetermined temperature range including a predetermined set temperature.

The first power meter 6 measures the power consumption of electronic devices (that is, an electric load 5 and a heating system control unit 8) other than the heat pump heating device 100. In other words, the heating system control unit 8 and the electric load 5 operate off power supplied from the energy supplier 4 via the first power grid. On the other hand, the second power meter 7 measures the power consumption of components of the heat pump heating device 100, such as the compressor, pump, and fan (not shown in the Drawings).

In other words, the components of the heat pump heating device 100 operate off power supplied from the energy supplier 4 via the second power grid.

The heating system control unit 8 is functionally capable of communicating with the energy supplier 4 and administering control commands to the heat pump heating device 100. For example, the heating system control unit 8 controls operation of the heat pump heating device 100 to reduce power consumption during the OM period.

The energy supplier 4 is a company which delivers electricity or gas to individual homes and, when the energy supplier 4 wishes to control the use of power by a given home, can reduce the consumption of power supplied to the individual homes via the second power grid by transmitting an OM signal.

Figure 3:
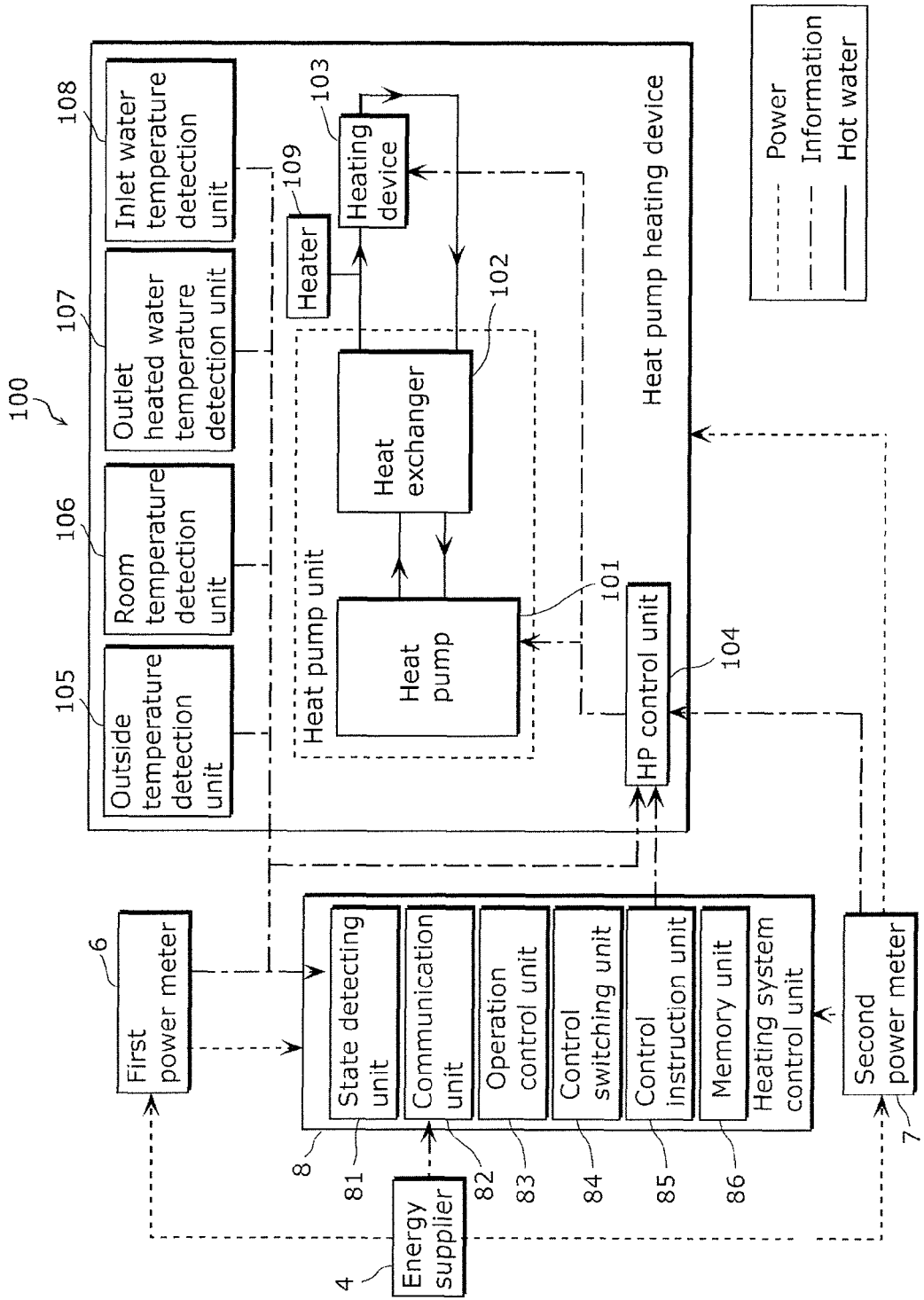
FIG. 3 is a block diagram showing the heat pump heating device and the heating system control unit according to the first embodiment in detail.
Figure 4:
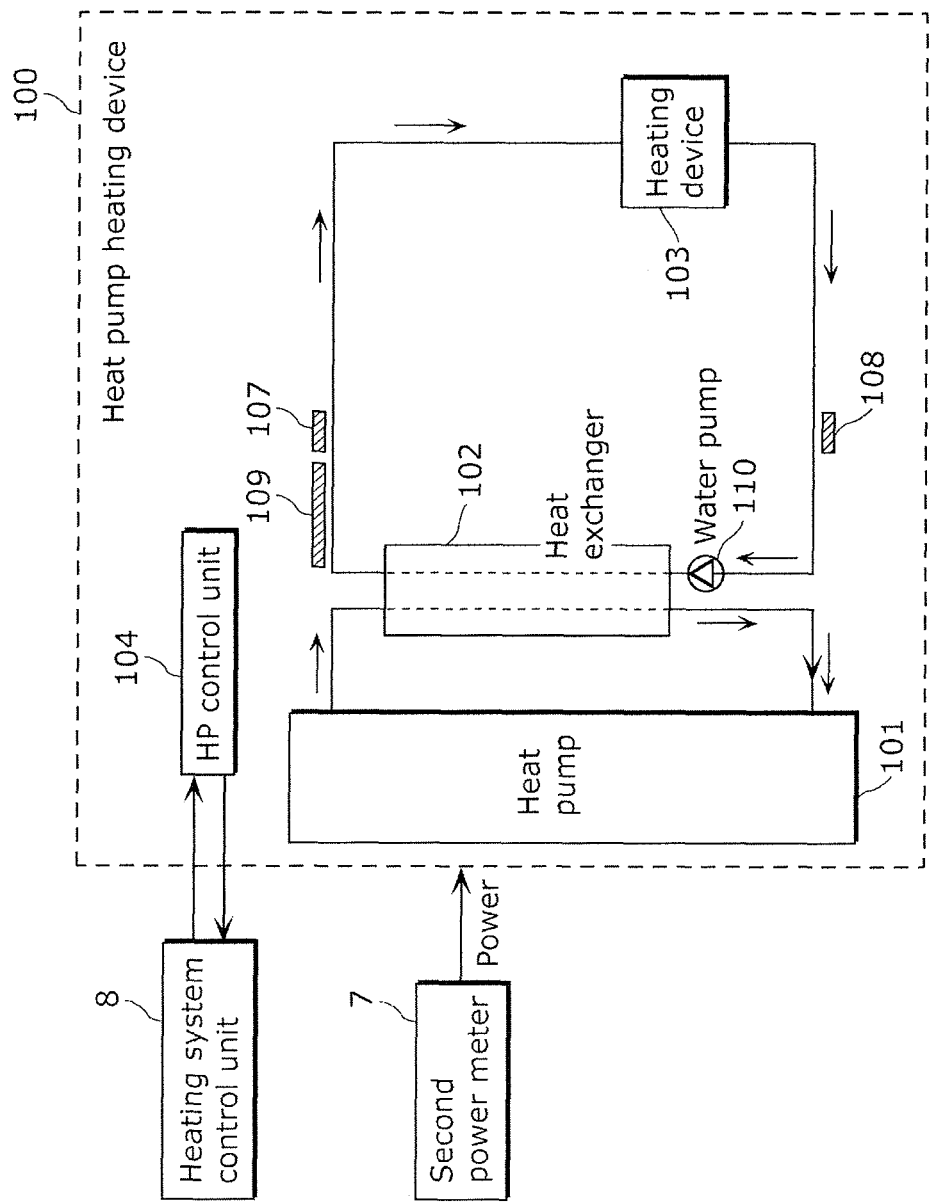
FIG. 4 is a block diagram showing the heat pump heating device according to the first embodiment in detail.

FIG. 3 and FIG. 4 are block diagrams showing the heat pump heating device 100 and the heating system control unit 8 according to the first embodiment of the present invention in detail. The heat pump heating device 100 shown in FIG. 3 and FIG. 4 includes the heat pump 101, the heat exchanger 102, the heating device 103, an HP control unit 104, an outside temperature detecting unit 105, a room temperature detecting unit 106, an outlet heated water temperature detecting unit 107, an inlet water temperature detecting unit 108, and a heater 109. Moreover, the combination of the heat pump 101 and the heat exchanger 102 is called the heat pump unit.

The heat pump 101 is an air-source heat pump which compresses a refrigerant into a high temperature-high pressure state. More specifically, although not included in the Drawings, the heat pump 101 includes an evaporator which facilitates heat exchange between outside air and low temperature-low pressure liquid refrigerant to generate a low temperature-low pressure vaporized refrigerant, a motor-driven compressor which compresses the low temperature-low pressure vaporized refrigerant into a high temperature-high pressure vaporized refrigerant, a condenser which facilitates heat exchange between the high temperature-high pressure vaporized refrigerant and circulating water (thermal storage medium) to generate a low temperature-high pressure liquid refrigerant, an expansion valve which reduces the pressure of the low temperature-high pressure vaporized refrigerant to generate a low temperature-low pressure liquid refrigerant, and a fan to accelerate the heat conversion between the refrigerant in the evaporator and the outside air, for example.

The refrigerant in the heat pump 101 is, for example, 410A. As a result of a property of this refrigerant, the temperature at the exit of the water cycle of the heat exchanger 102 peaks at 55 degrees Celsius, so the upper temperature limit of the heating temperature setting is set to 55 degrees Celsius.

The heat exchanger 102 facilitates heat exchange between the high temperature-high pressure refrigerant exiting by the heat pump 101 and the secondary side of the water cycle (that is, the water cycling between the heat exchanger 102 and the heating device 103). Moreover, as FIG. 4 shows, a water pump 110 is provided along the channel in which water flows from the heating device 103 to the heat exchanger 102. The water pump 110 adjusts the amount of water flowing into the heat exchanger 102.

The heating device 103 is a device for heating the inside of a home, such as a radiator or floor heater which radiates heat energy in a room via a radiator panel, for example. It is to be noted that a specific example of the heating device 103 is not limited to the foregoing, but corresponds to any device having a radiator unit which radiates heat generated by the heat pump 101 to a target.

The HP control unit 104 controls the amount of heat generated by the heat pump 101 so that the temperature of the room in which the heating device 103 is installed is maintained within a predetermined range that includes the set temperature. It is to be noted that in a normal operating state (that is, in a period other than the OM period), the HP control unit 104 controls operation of the heat pump 101 according to, for example, operation conditions set by a user. On the other hand, the HP control unit 104 controls operation of the heat pump 101 in accordance with instructions from the heating system control unit 8 during the OM period.

The outside temperature detecting unit 105 detects outside temperature, and more specifically, detects the outside temperature in the vicinity of the home (building) at which the heat pump heating device 100 is installed. The room temperature detecting unit 106 detects the temperature of a room, and more specifically, detects the temperature of the room (space) in which the heating device 103 is installed.

The outlet heated water temperature detecting unit 107 detects the temperature of the heated water exiting the heat exchanger 102, and as FIG. 4 shows, is installed along the channel in which water flows from the heat exchanger 102 to the heating device 103. The inlet water temperature detecting unit 108 detects the temperature of the water entering the heat exchanger 102, and as FIG. 4 shows, is installed along the channel in which water flows from the heating device 103 to the heat exchanger 102.

It is to be noted that the outside temperature detecting unit 105, the room temperature detecting unit 106, the outlet heated water temperature detecting unit 107, and the inlet water temperature detecting unit 108 are not intended to be limited to a specific configuration. For example, a general configuration which can measure temperature may be varied according the target to be measured. Examples include a thermocouple, a resistance thermometer, a thermistor, and a bimetallic thermometer.

The heater 109 is capable of further heating the heated water exiting the heat exchanger 102, and as FIG. 4 shows, is installed along the channel in which water flows from the heat exchanger 102 to the heating device 103. The heater 109 is not intended to be limited to a specific configuration. For example, the heater 109 may be an electrically-heated wire.

With the heat pump heating device 100 having the above configuration, the outlet heated water temperature, which is the temperature of the heated water exiting the heat exchanger 102, is set by the user, and operation conditions for the heat pump 101 are determined in order to achieve this set outlet heated water temperature. However, the heat pump 101 requires some time to reach a stable amount of generated heat after being turned on, and has trouble keeping up with the large settings changes in real time. For this reason, when the outlet heated water temperature detected by the outlet heated water temperature detecting unit 107 (the measured outlet heated water temperature) is less than the temperature set by the user (the set outlet heated water temperature), the heater 109 heats the heated water exiting the heat exchanger 102 to the set outlet heated water temperature.

The heating system control unit 8 includes a state detecting unit 81, a communication unit 82, an operation control unit 83, a control switching unit 84, a control instruction unit 85, and a memory unit 86. It is to be noted that in FIG. 2, FIG. 3, and FIG. 4, the heating system control unit 8 is configured to be structurally separate from the heat pump heating device 100. However, a configuration in which the heat pump heating device 100 and the heating system control unit 8 are combined, such as a configuration in which the heating system control unit 8 is placed where the HP control unit 104 is, is also acceptable.

The state detecting unit 81 detects (collects) a variety of information including the temperatures detected by the outside temperature detecting unit 105, the room temperature detecting unit 106, the outlet heated water temperature detecting unit 107, and the inlet water temperature detecting unit 108, as well as the amount of power consumption, for example, measured by the first power meter 6 and the second power meter 7.

The communication unit 82 receives the OM signal from the energy supplier 4. Moreover, the communication unit 82 notifies the energy supplier 4 of the reduction and restarting of the supply of to the heat pump heating device 100 via the second power grid. It is to be noted that the communication unit 82 may communicate with the energy supplier 4 via power line communication (PLC), or may communicate with the energy supplier 4 via a different method, such as the internet.

It is to be noted that the OM signal may be transmitted from the energy supplier 4 prior to the start of the OM period for reducing power use by each home (from 0.5 to 12 hours in advance, for example). In this case, information specifying the OM period start time and end time is included in the OM signal.

Here, "information specifying the OM period start time and end time" is not limited to a specific example, and may be information specifying actual start and end times (such as "start time: 18:00; end time: 20:00") or information indicating the start time and length of the OM period (such as "start time: 18:00; OM time: 2 hours").

Moreover, the start time of the OM period may not be expressly stated in the OM signal. Instead, the start time may be the receipt time of the OM signal. In this case, information specifying the OM period end time or the length of the OM period is included in the OM signal.

Furthermore, the OM signal, in addition to the above information, may include a degree of reduction indicating a degree of reduction in power consumption during the OM period, such as "high", "moderate", or "low". For example, "high" is a value that requests reduction of power consumption to a great degree, even at the cost of sacrificing comfort somewhat. On the other hand, "low" is a value that requests reduction of power consumption to a low degree that is within a range in which a high level of comfort is maintained. Finally, "moderate" is a value that is intermediate between "high" and "low".

The operation control unit 83 determines the operation conditions for the heat pump heating device 100 for the OM period. Specifically, the operation control unit 83 determines operation conditions (compressor frequency, expansion valve aperture, etc.) for the heat pump 101 that make the heat pump 101 generate an amount of power (the second amount of heat) that is less than the amount of power generated per unit time by the heat pump 101 in a period other than the OM period (the first amount of heat). The outlet heated water temperature can be increased by increasing the frequency of the compressor since the heat pump output increases as the compressor frequency increases. Processes for determining these operation conditions are performed, for example, when the OM signal is received by the communication unit 82 from the energy supplier 4, but the process of determination is not limited to this.

It is to be noted that in the first embodiment, it was explained that the amount of heat generated per unit time by the heat pump 101 is reduced from the first amount of heat to the second amount of heat by changing the temperature of the heated water exiting the heat exchanger 102 (the outlet heated water temperature) from the first temperature (55 degrees Celsius, for example) to the lower second temperature (41 degrees Celsius, for example). Here, the heated water exiting the heat exchanger 102 (heated water output) is a constant amount.

The control switching unit 84 switches the operation of the HP control unit 104 between OM period operation and non-OM period operation. Specifically, in a period other than the OM period, the control switching unit 84 gives internal control of the heat pump heating device 100 by the HP control unit 104 priority. Conversely, during the OM period, the HP control unit 104 controls each of the previously mentioned constituents according to the operation conditions determined by the operation control unit 83 and received from the control instruction unit 85.

The control instruction unit 85 sends the operation conditions determined by the operation control unit 83 to the HP control unit 104 of the heat pump heating device 100.

The memory unit 86 stores a variety of information necessary for the operation of the heating system control unit 8, such as an outlet heated water temperature settings table (to be described later). The memory unit 86 is not intended to be limited to a specific configuration, and may be any means of storage capable of recording data, such as dynamic random access memory (DRAM), synchronous dynamic random access memory (SDRAM), flash memory, ferrodielectric memory, or a hard disk drive (HDD).

Next, the control method of the heat pump according to the first embodiment will be explained with reference to FIG. 5A through FIG. 9. It is to be noted that the first embodiment is premised on the heat pump heating device 100 shown in FIG. 2, FIG. 3, and FIG. 4, but the room temperature detecting unit 106, the outlet heated water temperature detecting unit 107, the inlet water temperature detecting unit 108, and the heater 109 can be omitted.

Figure 5A:
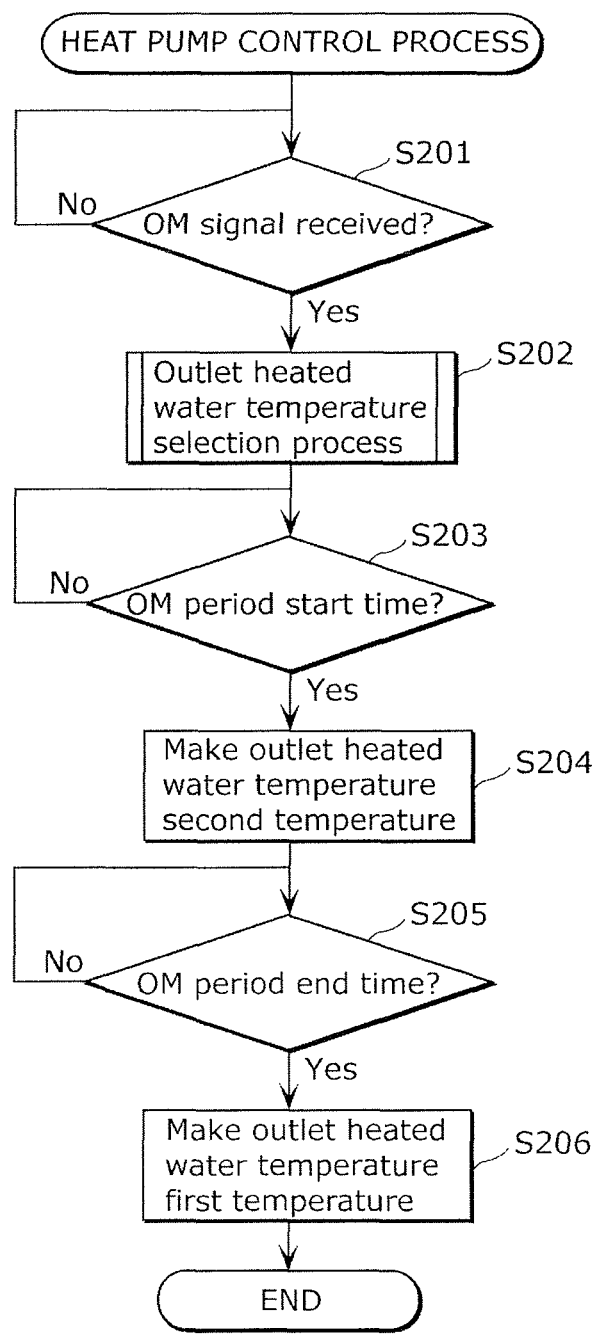
FIG. 5A is a flow chart of the heat pump control process according to the first embodiment.
Figure 6:
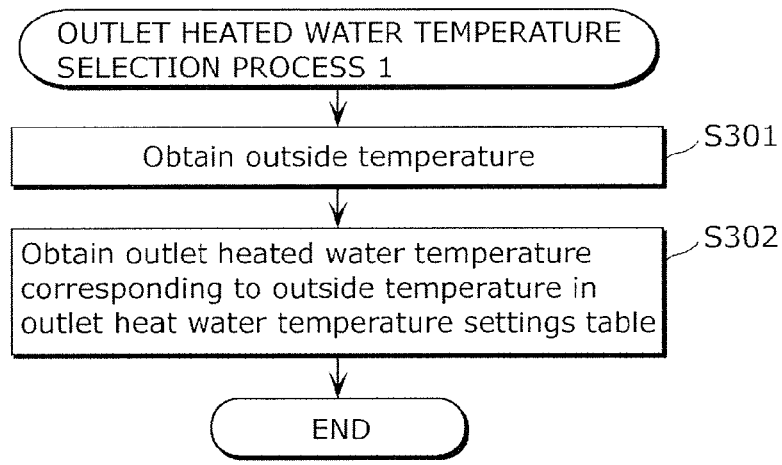
FIG. 6 is a flowchart of an outlet heated water temperature selection process shown in FIG. 5A.

FIG. 5A is a flow chart of the heat pump control process according to the first embodiment. FIG. 6 is a flowchart of the outlet heated water temperature selection process (S202) shown in FIG. 5A.

First, as FIG. 5A shows, the operation control unit 83 monitors the reception of the OM signal from the energy supplier 4 by the communication unit 82 (S201). When the OM signal is received (yes in S201), the operation control unit 83 performs the outlet heated water temperature selection process (S202). The outlet heated water temperature selection process is the process of selecting (determining) the temperature of the heated water to exit the heat exchanger (outlet heated water temperature) during the OM period.

Next, FIG. 6 will be used to explain step S202 shown in FIG. 5A. As FIG. 6 shows, the operation control unit 83 obtains, via the state detecting unit 81, the outside temperature detected by the outside temperature detecting unit 105 (S301). The operation control unit 83 then selects, from the outlet heated water temperature settings table stored in the memory unit 86, the outlet heated water temperature corresponding with the outside temperature obtained in step S301 (S302).

An example of an outlet heated water temperature settings table according to the first embodiment is shown in FIG. 7.

The outlet heated water temperature settings table shown in FIG. 7 holds information in which predetermined outside temperatures and outlet heated water temperatures are associated. In other words, when an outside temperature is specified as input information, the outlet heated water temperature which corresponds with the input outside temperature can be obtained as output information. It is to be noted that the maximum and minimum outlet heated water temperature values are determined based on the ability of the heat pump 101. In this example, the maximum value is 55 degrees Celsius, and the minimum value is 30 degrees Celsius.

It is to be noted that the outlet heated water temperature settings table shown in FIG. 7 is designed so that the temperature of the room in which the heating device 103 is installed does not drop below the predetermined minimum temperature (18 degrees Celsius, for example) during the OM period. Specifically, the association is such that outlet heated water temperature increases as the outside temperature decreases. In other words, since the temperature of the room drops more rapidly the lower the outside temperature is, it is necessary to increase the outlet heated water temperature in order to keep the room at a temperature at which comfort is not excessively sacrificed during the OM period.

The above relationship is calculated beforehand after trial testing, for example, and stored in the memory unit 86. The outlet heated water temperature settings table shown in FIG. 7 is an example which holds outlet heated water temperatures for preventing the temperature of the room at the end of the OM period from dropping below 18 degrees Celsius that are associated with outside temperatures. It is to be noted that 18 degrees Celsius is an example of a room temperature at which user comfort is not excessively sacrificed. However, this temperature is not limited to 18 degrees Celsius.

It is also to be noted that in the above example, associations between discrete outside temperatures and outlet heated water temperatures are held as the outlet heated water temperature settings table. However, the configuration is not limited to this example. For example, a function representing a continuous association between outside temperature and outlet heated water temperature may be held in the memory unit 86. The outside temperature may then be input into the function to obtain the corresponding outlet heated water temperature. This can also be applied in a similar manner to the "association" referred to hereinafter.

The operation control unit 83 then, for example when the outside temperature is −10 degrees Celsius, selects 41 degrees Celsius as the outlet heated water temperature. Moreover, the outlet heated water temperature may be calculated using linear interpolation when a value matching the outside temperature detected by the outside temperature detecting unit 105 is not held in the outlet heated water temperature settings table. The operation control unit 83 then determines operation conditions for the heat pump 101 to reach the selected outlet heated water temperature, and returns to the heat pump control process shown in FIG. 5A.

Next, returning to FIG. 5A, the operation control unit 83 waits for the start of the OM period (S203). At this time, the heat pump 101 operates using operation conditions for achieving the outlet heated water temperature set by the user (first temperature). Moreover, the outlet heated water temperature selected in the previously-stated outlet heated water temperature selection process (second temperature) (S202) is lower than the first temperature.

When the time reaches the OM period start time (yes in S203), the operation control unit 83 causes the outlet heated water temperature of the heat exchanger 102 to change from the first temperature to the second temperature (S204). That is to say, the operation control unit 83 transmits operation conditions for making the outlet heated water temperature the second temperature to the HP control unit 104 via the control instruction unit 85.

Additionally, the control switching unit 84 switches the operation of the HP control unit 104 to follow the control according to the operation control unit 83. To this end, the HP control unit 104 controls the operation of the heat pump 101 according to the operation conditions transmitted from the operation control unit 83 via the control instruction unit 85. As a result, the heat pump 101 generates an amount of heat (the second amount of heat) required to keep the heated water being output from the heat exchanger 102 at the second temperature.

Next, the operation control unit 83 waits for the end of the OM period (S205). When the time reaches the OM period end time (yes in S205), the operation control unit 83 causes the outlet heated water temperature of the heat exchanger 102 to change from the second temperature to the first temperature (S206). That is to say, the operation control unit 83 returns the operation conditions of the heat pump 101 to those prior to step S203.

It is to be noted that in the above example, the outlet heated water temperature selection process is performed at a point in time at which the OM signal is received, but this example is not intended to be limiting. For example, when the OM signal is received a few hours before the start of the OM period (for example, 2 hours beforehand), the outlet heated water temperature selection process may be performed right before the start of the OM period (for example, 1 minute before). The operation conditions for the heat pump 101 can be determined in this manner using the outside temperature last obtained before the start of the OM period.

Moreover, in the above example, the operation conditions for making the outlet heated water temperature the second temperature are transmitted to the HP control unit 104 at the start of the OM period (S204), but this example is not intended to be limiting. For example, before the start time of the OM period, the operation control unit 83 may transmit, to the HP control unit 104 via the control instruction unit 85, the operation conditions for making the outlet heated water temperature the second temperature and the start time for operating the heat pump 101 with these operation conditions (in other words, the start time of the OM period). The same applies for transmitting the operation conditions for returning the outlet heated water temperature to the first temperature (S206).

Furthermore, in the above example, the determining of the operation conditions for making the outlet heated water temperature the second temperature was performed by the operation control unit 83, but the HP control unit 104 may make this determination. In this case, the operation control unit 83 transmits the outlet heated water temperature selected in the outlet heated water temperature selection process (second temperature) (S202) to the HP control unit 104 via the control instruction unit 85. The HP control unit 104 may then determine the operation conditions for making the outlet heated water temperature the second temperature and control the operation of the heat pump 101 according to the determined operation conditions.

The flowchart in FIG. 5A outlines heat pump control process in which the outlet heated water temperature (the second temperature) is selected after the reception of the OM signal and the outlet heated water temperature (the second temperature) is maintained at a constant temperature from the start of the OM period to the end.

Figure 5B:
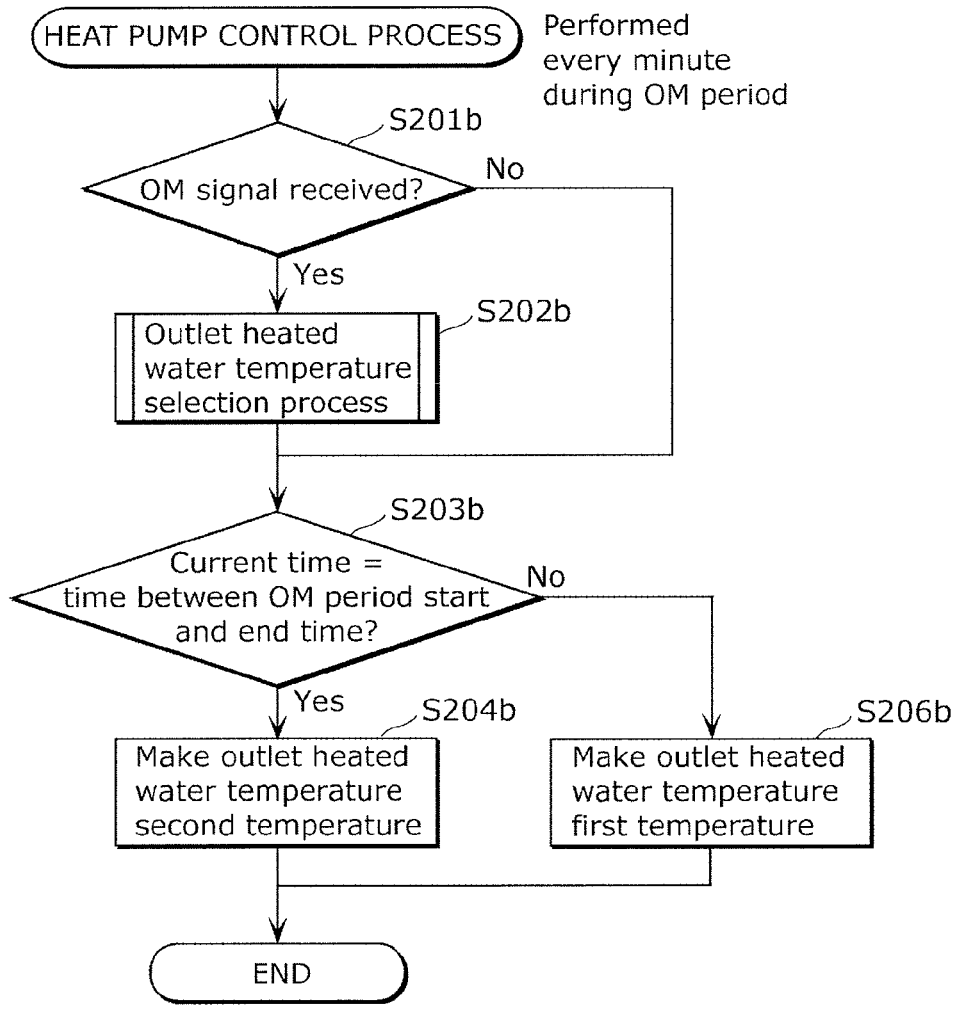
FIG. 5B is a variation of the flow chart of the heat pump control process according to the first embodiment.

Furthermore, the flowchart in FIG. 5B outlines heat pump control process in which the outlet heated water temperature (the second temperature) is selected every minute, even during the OM period. Here, "every minute" specifically means that the heat pump control process is repeated each minute. For example, when the start time of the OM period is 18:00 and the end time is 20:00, the process is performed at 18:00, 18:01, 18:02, etc., until 20:00. It is to be noted that for the purpose of clarifying the association between each process shown in FIG. 5A and FIG. 5B, each step shown in FIG. 5B is assigned with the corresponding step number from FIG. 5A with a "b" added to the tail end.

First, the operation control unit 83 determines whether the OM signal has been received (S201b). When the OM signal has been received (yes in S201b), the operation control unit 83 performs the outlet heated water temperature selection process (S202b). On the other hand, when the OM signal has not been received (no in S201b), the operation control unit 83 skips to step S202b.

Next, the operation control unit 83 determines whether the current time falls between the start and end of the OM period (for example, falls between 18:00 and 20:00) (S203b). When the current time falls within the OM period (yes in S203b), the operation control unit 83 sets the outlet heated water temperature to be the second temperature selected in the outlet heated water temperature selection process (S204b). On the other hand, when the current time does not fall within the OM period (no in S203b), the operation control unit 83 sets the outlet heated water temperature to be the first temperature set by the user (S206b).

Figure 8A:
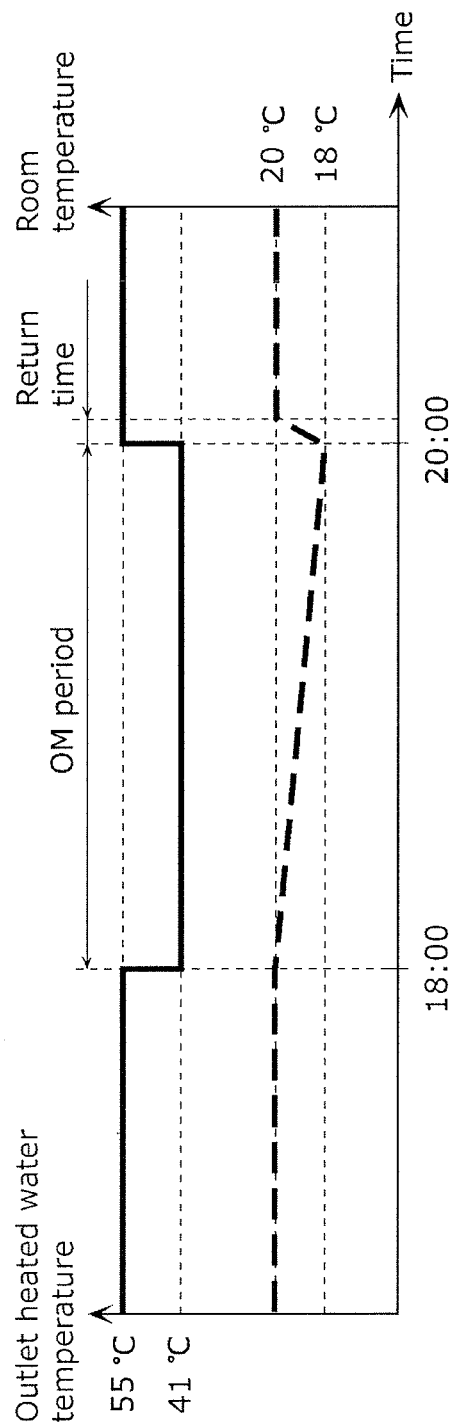
FIG. 8A is a graph showing a shift in outlet heated water temperature and room temperature when the heat pump control process is performed according to the first embodiment.
Figure 8B:
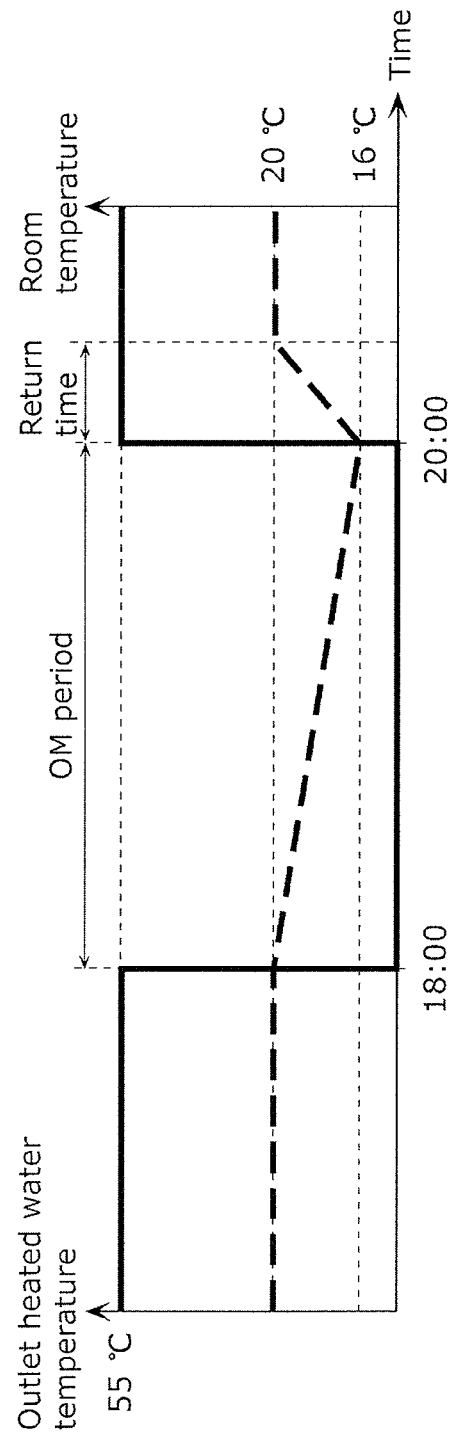
FIG. 8B is a graph showing a shift in outlet heated water temperature and room temperature when the heat pump is stopped during the OM period.

Next, an advantage of the above-described heat pump control process is described with reference to FIG. 8A and FIG. 8B. FIG. 8A is a graph showing a shift in outlet heated water temperature (solid line) and room temperature (dashed line) when heat pump control process shown in FIG. 5A is performed. FIG. 8B is a graph showing a shift in outlet heated water temperature (solid line) and room temperature (dashed line) when the heat pump 101 is stopped during the OM period. It is to be noted that in this example, the first temperature set by the user is 55 degrees Celsius, the second temperature selected in the outlet heated water temperature selection process is 41 degrees Celsius, and the OM period is a two hour period from 18:00 to 20:00.

First, in the example shown in FIG. 8A, the outlet heated water temperature is changed from 55 to 41 degrees Celsius at 18:00 (start time of the OM period) (S204 in FIG. 5A), and the outlet heated water temperature is changed from 41 to 55 degrees Celsius at 20:00 (end time of the OM period) (S206 in FIG. 5A).

It is to be noted that the change in outlet heated water temperature is shown to be immediate at the start and end time of the OM period in FIG. 8A since the outlet heated water temperature is a set temperature (target temperature) according to which the operation of the heat pump 101 is controlled by the HP control unit 104, but the actual outlet heated water temperature gradually changes over a period of time (approximately ranging from a few seconds to a few minutes) at the start time and the end time of the OM period (this applies to the following Drawings as well).

As described, the outlet heated water temperature changes depending on the amount of heat generated by the heat pump 101 per unit time. In other words, the amount of heat generated per unit time during the OM period (the second amount of heat) is lower than the amount of heat generated per unit time in a period other than the OM period (the first amount of heat). However, in the heat pump control process shown in FIG. 5A, the second amount of heat becomes a value larger than 0 (W) since the heat pump 101 is not stopped during the OM period.

Similarly, the power consumption of the heat pump 101 changes according to the amount of heat generated per unit time. In other words, the power consumption necessary for the heat pump 101 to maintain the outlet heated water temperature at the second temperature during the OM period is less than the power consumption necessary for the heat pump 101 to maintain the outlet heated water temperature at the first temperature in a period other than the OM period.

When the energy supplier 4 sets the OM period to be peak period of power supply via the second power grid, power consumption by the heat pump 101 installed in each home is reduced little by little. As such, peak power consumption can be cut.

Moreover, in the example shown in FIG. 8A, the temperature of the room held at 20 degrees Celsius up until the OM period start time of 18:00 gradually decreases thereafter, reaching 18 degrees Celsius at the OM period end time of 20:00, then climbing once again to 20 degrees Celsius. It is to be noted that FIG. 8A shows the shift in room temperature to be linear, but in fact non-linear shifts in room temperature are not improbable (this applies to the following Drawings as well).

In this example, an outlet heated water temperature of 55 degrees Celsius is required to maintain the temperature of the room at 20 degrees Celsius. Next, the temperature of the room gradually decreases to 18 degrees Celsius as a result of the change in outlet heated water temperature during the OM period to 41 degrees Celsius. The temperature of the room is then gradually increased from 18 to 20 degrees Celsius by returning the outlet heated water temperature to 55 degrees Celsius at the end of the OM period.

Conversely, since the heat pump 101 is completely shut off during the OM period in the example shown in FIG. 8B, the heat exchanger 102 does not output heated water at this time (this state is represented as outlet heated water temperature 0 degrees Celsius in FIG. 8B). In other words, from the perspective of power consumption reduction, the example shown in FIG. 8B is more effective than the example shown in FIG. 8A.

Nevertheless, in the example shown in FIG. 8B, the temperature of the room period drops more rapidly (the incline of dashed line) during the OM and is lower at the end of the OM period than the example shown in FIG. 8A (16 degrees Celsius as compared to 18 degrees Celsius). In other words, from the perspective of comfort during the OM period, the example shown in FIG. 8A is more effective than the example shown in FIG. 8B.

Furthermore, in the example shown in FIG. 8A, since the heat pump 101 is not shut off during the OM period, the time required to return the temperature of the room to 20 degrees Celsius at the end of the OM period (the period labeled "return time" in the Drawings) is drastically shorter than the example shown in FIG. 8B. That is to say, in the example shown in FIG. 8A, the temperature of the room can be quickly returned to the original temperature set by the user (20 degrees Celsius) at the end of the OM period.

As just shown, with the heat pump control process according to the first embodiment, in contrast to complete stoppage of the heat pump 101 during the OM period, a high level of comfort can be maintained and reduction of power consumption, albeit limited, can be achieved.

It is to be noted that in the above example, the outlet heated water temperature for the OM period (the second temperature) was selected in accordance with the outside temperature using the outlet heated water temperature settings table shown in FIG. 7. However, this example is not intended to be limiting. The outlet heated water temperature for the OM period may be a fixed value independent of outside temperature, for example. This fixed value may be set according to the climate of the region in which the heat pump 101 is installed (minimum or average temperature, for example), or may be set according to the capability of the heat pump 101 (setting the minimum outlet heated water temperature to 30 degrees Celsius, for example).

[First Variation of First Embodiment]

Information specifying the OM period start time and end time is included in the OM signal. Furthermore, when "information indicating degree of reduction" is included in the OM signal, the outlet heated water temperature selected in the outlet heated water temperature selection process may be corrected based on this information. For example, as is shown by the solid line in FIG. 9, when the degree of reduction in power consumption is "moderate", the outlet heated water temperature selected in the outlet heated water temperature selection process (41 degrees Celsius) is kept to be the same.

Figure 9:
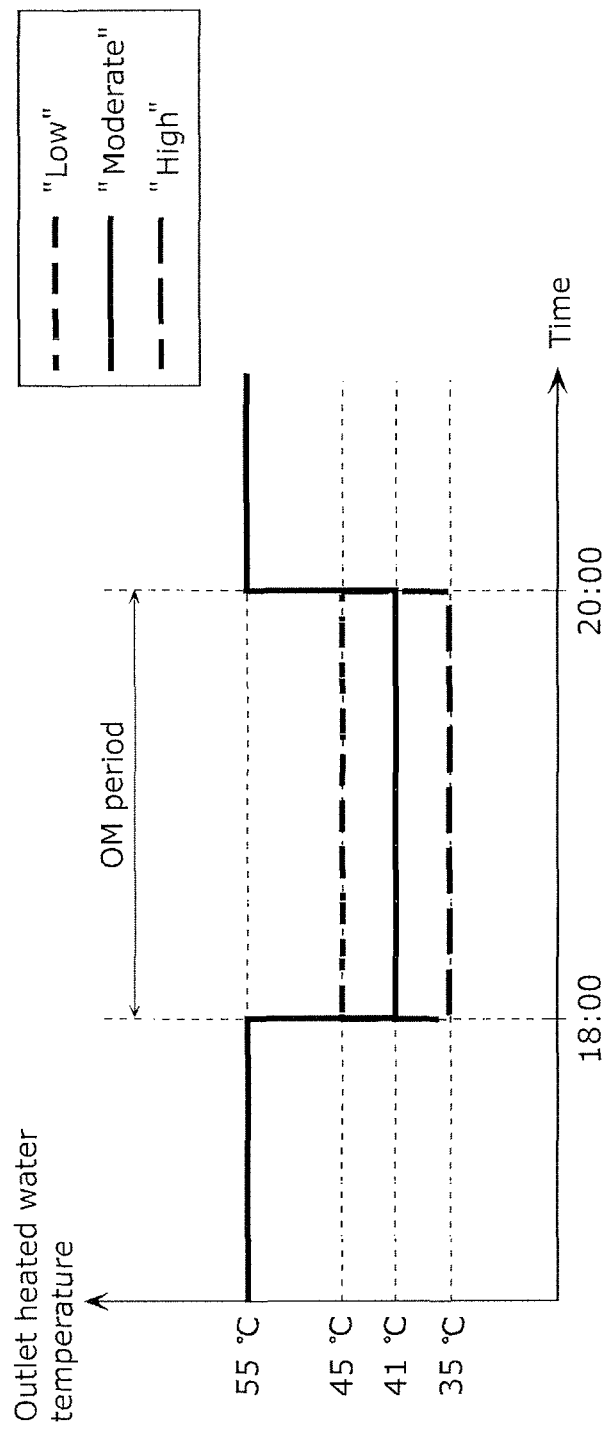
FIG. 9 shows a shift in outlet heated water temperature and room temperature according to a variation of the first embodiment.

In contrast, as is shown by the short dashed line in FIG. 9, when the degree of reduction in power consumption is "low", the outlet heated water temperature selected in the outlet heated water temperature selection process (41 degrees Celsius) is increased by a given amount (4 degrees Celsius in the example shown in FIG. 9) to 45 degrees Celsius, which is made to be the second temperature. With this, the amount of decrease in room temperature during the OM period is reduced in exchange for a decrease in the degree of reduction in power consumption. In other words, a higher level of comfort can be preserved.

Conversely, as is shown by the long dashed line in FIG. 9, when the degree of reduction in power consumption is "high", the outlet heated water temperature selected in the outlet heated water temperature selection process (41 degrees Celsius) is decreased by a given amount (6 degrees Celsius in the example shown in FIG. 9) to 35 degrees Celsius, which is made to be the second temperature. With this, the degree of reduction in power consumption is increased in exchange for an increase in the amount of decrease in room temperature during the OM period.

In other words, when the degree of power consumption moderation is greater than the criterion "moderate" (that is, when "high"), the selected outlet heated water temperature is corrected to a lower value. Likewise, when the degree of power consumption moderation is less than the criterion "moderate" (that is, when "low"), the selected outlet heated water temperature is corrected to a higher value.

In this way, a high level of comfort can be more adequately maintained and the power consumption can be more adequately reduced as a result of the energy supplier 4 adequately setting the "information indicating degree of reduction" in accordance with the current power usage condition. It is to be noted that the above amount of increase (4 degrees Celsius) and the amount of decrease (6 degrees Celsius) are merely examples, and are not intended to be limiting.

It is also to be noted that this variation can also be applied to the second embodiment to be described later.

[Second Variation of First Embodiment]

When the heat pump heating device 100 includes the heater 109, the operation control unit 83 includes, in the operation conditions, information whether operation of the heater 109 is permitted or prohibited during the OM period and in a period other than the OM period, and transmits this information to the HP control unit 104 via the control instruction unit 85.

Specifically, the operation control unit 83 permits operation of the heater 109 in a period other than the OM period. In other words, in a period other than the OM period, when the actual outlet heated water temperature (the outlet heated water temperature detected by the outlet heated water temperature detecting unit 107) is less than the outlet heated water temperature set by the user (the first temperature), the heated water exiting the heat exchanger 102 can be heated by the heater 109 until the temperature reaches the first temperature.

On the other hand, the operation control unit restricts (prohibits) operation of the heater 109 during the OM period. In other words, during the OM period, even when the actual outlet heated water temperature is less than the second temperature, operation of the heater 109 is prohibited.

Compared to the heat pump 101, a high power consumption is required of an average heater 109 to generate the same amount of heat. Thus, during the OM period, during which power consumption is intended to be reduced, it is preferable not to operate the heater 109. Consequently, comfort is slightly sacrificed, but power consumption can be effectively reduced.

It is to be noted that this variation can also be applied to the second through fifth embodiments which will be described later.

[Second Embodiment]

Next, the control method of the heat pump according to the second embodiment will be explained with reference to FIG. 10, FIG. 11, FIG. 12, FIG. 13A, FIG. 13B, and FIG. 13C. It is to be noted that the second embodiment is premised on the heat pump heating device 100 shown in FIG. 2, FIG. 3, and FIG. 4, but the room temperature detecting unit 106, the outlet heated water temperature detecting unit 107, the inlet water temperature detecting unit 108, and the heater 109 may be omitted.

Figure 10:
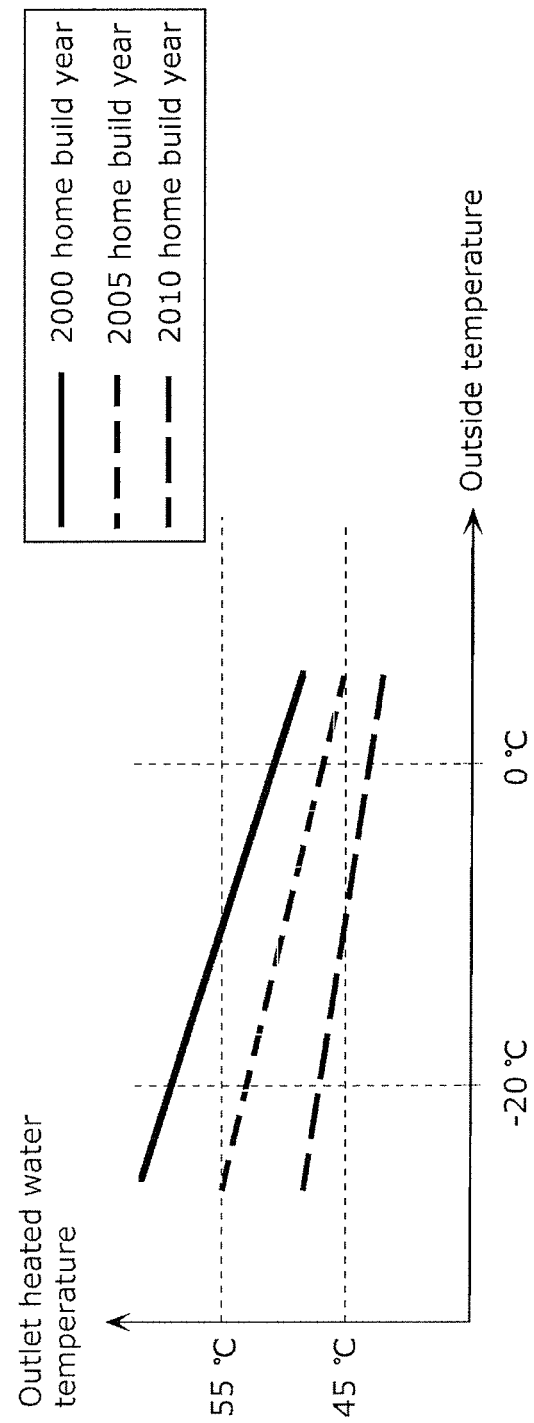
FIG. 10 is a graph showing, for each home efficiency (thermal insulation efficiency), the relationship between the outlet heated water temperature and the outside temperature for bringing the amount of decrease in room temperature to within 2 degrees Celsius.

FIG. 10 is a graph showing, for each home efficiency (thermal insulation efficiency), the relationship between the outlet heated water temperature and the outside temperature which is for bringing the amount of decrease in room temperature to within two degrees Celsius. Home thermal insulation efficiency generally depends on the year the home was built. Typically, newer homes have better thermal insulation efficiency, and older homes have worse thermal insulation efficiency. That is to say, as FIG. 10 shows, older homes require a higher outlet heated water temperature in order to make the amount of decrease in room temperature to be within 2 degrees Celsius. Moreover, in order to maintain a room temperature at which comfort is not exceedingly sacrificed during the OM period, it is necessary to increase the outlet heated water temperature for the OM period (the second temperature) as the length of the OM period increases.

For this reason, in the second embodiment, an example will be given in which an outlet heated water temperature for the OM period is selected taking into account the OM time and the home efficiency (mainly, the thermal insulation efficiency of the home) in addition to the outside temperature as in the first embodiment. It is to be noted that the OM time is included in the OM signal in the second embodiment. Moreover, the home thermal insulation efficiency is represented by the year that the home was built (the older the home the lower the thermal insulation efficiency; the newer the home the higher the thermal insulation efficiency), and is set at the time of installation of the heat pump heating device 100.

Figure 11:
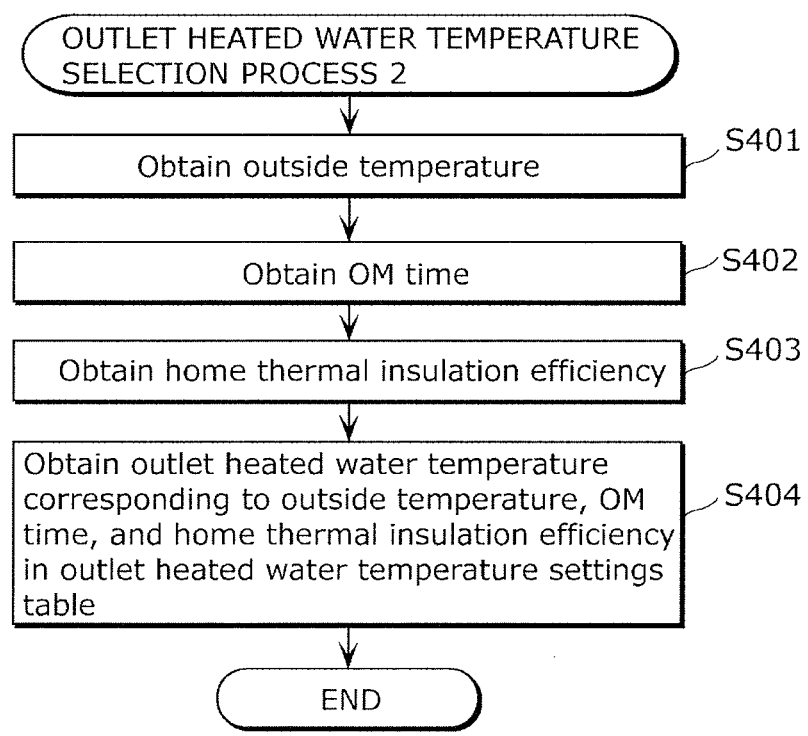
FIG. 11 is a flowchart of an outlet heated water temperature selection process according to the second embodiment.

FIG. 11 is a flowchart of an outlet heated water temperature selection process (S202 in FIG. 5A) according to the second embodiment. Since the overall flow of heat pump control process is similar to that of FIG. 5A, the explanation will focus on the points of difference, and details regarding common points with the first embodiment will be omitted.

As FIG. 11 shows, the operation control unit 83 obtains, via the state detecting unit 81, the outside temperature detected by the outside temperature detecting unit 105 (S401). Moreover, the operation control unit 83 obtains the OM time from the OM signal received by the communication unit 82 (S402). The operation control unit 83 further obtains the build year indicative of the thermal insulation efficiency of the home in which the heat pump heating device 100 is installed (S403).

The operation control unit 83 then selects, from the outlet heated water temperature settings table stored in the memory unit 86, the outlet heated water temperature corresponding with the outside temperature, the OM time, and the build year of the home obtained in steps S401 through S403 (S404).

An example of an outlet heated water temperature settings table according to the second embodiment is shown in FIG. 12. The outlet heated water temperature settings table shown in FIG. 12 holds information on associations between predetermined outside temperature, OM time, home build year, and outlet heated water temperature. That is, a table corresponding to the OM time and the home build year is selected, and the outlet heated water temperature corresponding with the outside temperature (input information) is obtained from the selected table as output information.

It is to be noted that in FIG. 12, a plurality of associations between outside temperature and outlet heated water temperature are given for each OM time and build year combination, but this table structure is not intended to be limiting. For example, a single table in which the input information is OM time, home build year, and outside temperature, and the output information is outlet heated water temperature is acceptable.

It is to be noted that the outlet heated water temperature settings table shown in FIG. 12 is designed so that the amount of decrease in temperature of the room in which the heating device 103 is installed does not exceed a predetermined amount (2 degrees Celsius, for example) during the OM period. Specifically, the outlet heated water temperature increases as the outside temperature decreases, the outlet heated water temperature increases as the OM period length increases, and the outlet heated water temperature increases as the home build year becomes older. An outlet heated water temperature at which the difference in room temperature between the start and end of the OM period does not exceed 2 degrees Celsius is set with respect to a combination of the outside temperature, OM time, and home build year. However, 2 degrees Celsius is merely an example of a difference in room temperature at which user comfort is not excessively sacrificed. This temperature range is not limited to 2 degrees Celsius.

The operation control unit 83 then, for example when the outside temperature is −10 degrees Celsius, the OM time is one hour, and the build year of the home in which the heat pump heating device 100 is installed is 2000, selects 33 degrees Celsius as the outlet heated water temperature (the second temperature). The operation control unit 83 then determines operation conditions for the heat pump 101 to reach the selected second temperature, and returns to the heat pump control process shown in FIG. 5A.

Figure 13A:
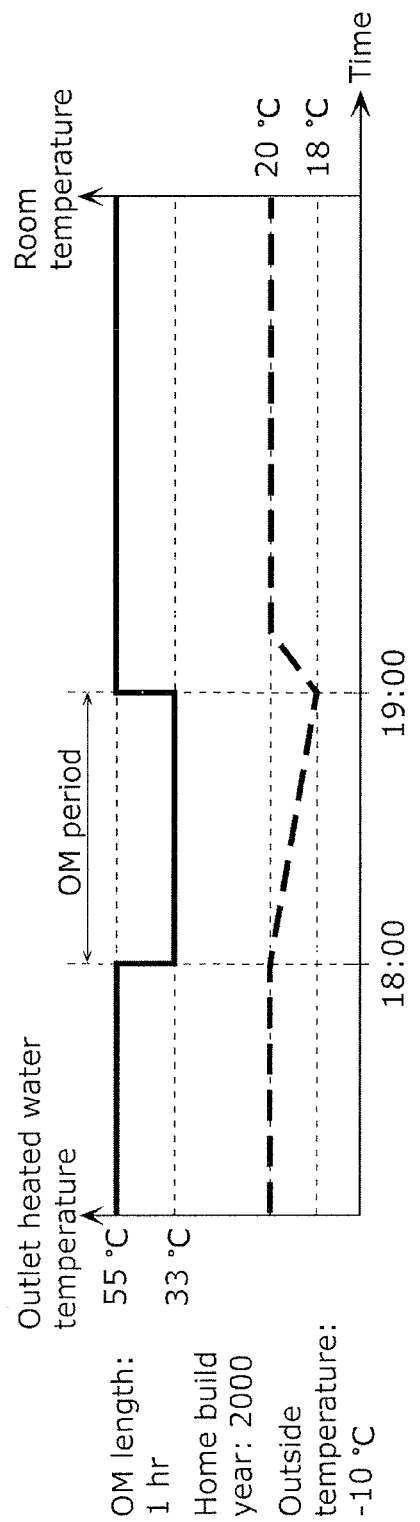
FIG. 13A shows an example of a shift in outlet heated water temperature and room temperature according to the second embodiment.
Figure 13C:
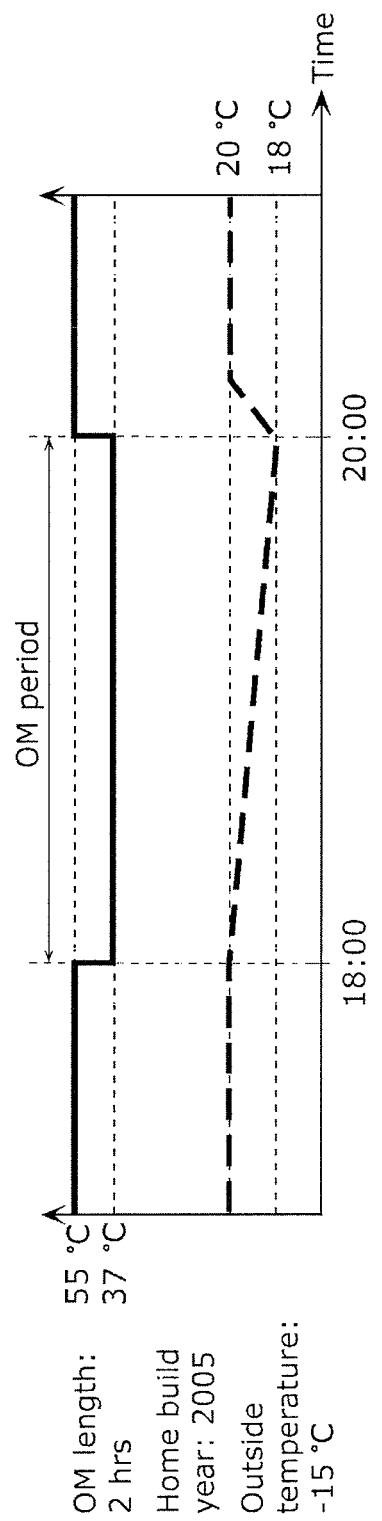
FIG. 13C shows another example of a shift in outlet heated water temperature and room temperature according to the second embodiment.

Next, an advantage of the above-described heat pump control process is described with reference to FIG. 13A, FIG. 13B, and FIG. 13C. FIG. 13A is a graph showing a shift in outlet heated water temperature (solid line) and room temperature (dashed line) when the outside temperature is −10 degrees Celsius, the OM time is one hour, and the home build year is 2000. FIG. 13B is a graph showing a shift in outlet heated water temperature (solid line) and room temperature (dashed line) when the outside temperature is −10 degrees Celsius, the OM time is two hours, and the home build year is 2000. FIG. 13C is a graph showing a shift in outlet heated water temperature (solid line) and room temperature (dashed line) when the outside temperature is −15 degrees Celsius, the OM time is two hours, and the home build year is 2005. Moreover, in all three cases, the OM period start time is 18:00 and the first temperature set by the user is 55 degrees Celsius.

First, looking at FIG. 13A and FIG. 13B, it is necessary to make the second temperature greater for the long OM time in the example shown in FIG. 13B (37 degrees Celsius) than in FIG. 13A (33 degrees Celsius) in order to prevent the room temperature from dropping more than 2 degrees Celsius during the OM period. Moreover, looking at FIG. 13B and FIG. 13C, even though the home build year is older in FIG. 13B, the resultant outlet heated water temperature to prevent the room temperature from dropping more than 2 degrees Celsius during the OM period for both examples is 37 degrees Celsius since the outside temperature in FIG. 13C is lower.

As is shown by these examples, the second temperature is determined so that the amount of decrease in room temperature during the OM period stays within a predetermined range. This makes it possible to both maintain a high level of comfort and reduce power consumption.

It is to be noted that the outlet heated water temperature selection table according to the first embodiment (shown in FIG. 7) is designed so that the absolute value of the room temperature at the end of the OM period (in other words, the lowest room temperature) does not drop below a predetermined value (18 degrees Celsius). In contrast, the outlet heated water temperature selection table according to the second embodiment (FIG. 12) is designed so that difference in room temperature from the beginning to the end of the OM period does not fall out of a predetermined range (2 degrees Celsius).

Moreover, in the first embodiment, only outside temperature is used as input information for the outlet heated water temperature selection table. Conversely, in the second embodiment, outside temperature, OM time, and home thermal insulation efficiency are used as input information for the outlet heated water temperature selection table. However, the variables used for input information in the first and second embodiments are not limited to these examples. In other words, the outlet heated water temperature selection tables according to the first and second embodiments can be designed to use, as input information, at least one of outside temperature, OM time, or home thermal insulation efficiency.

For example, the outlet heated water temperature selection table according to the first embodiment may be designed to use outside temperature and OM time as input information, or outside temperature and home thermal insulation efficiency as input information. Furthermore, it goes without saying that other pairings may be used as well. This also applies to the outlet heated water temperature selection table according to the second embodiment.

Moreover, other information, such as the thermal radiation efficiency of the heating device 103 or the inlet water temperature detected by the inlet water temperature detecting unit 108, may be used as input information. However, among the input information variables described above, the outside temperature variable varies the most depending on the season and the start time of the OM period. As such, it is preferable that at least outside temperature be included in the input information. When some of the above variables are omitted from the input information, the outlet heated water temperature selection table is designed on the assumption that general values are set for the omitted input information variables.

[Third Embodiment]

Next, the control method of the heat pump according to the third embodiment will be explained with reference to FIG. 14A, FIG. 14B, FIG. 15, FIG. 16, FIG. 17A, FIG. 17B, and FIG. 18. It is to be noted that the third embodiment is premised on the heat pump heating device 100 shown in FIG. 2, FIG. 3, and FIG. 4, but the room temperature detecting unit 106, the outlet heated water temperature detecting unit 107, the inlet water temperature detecting unit 108, and the heater 109 may be omitted.

Figure 14A:
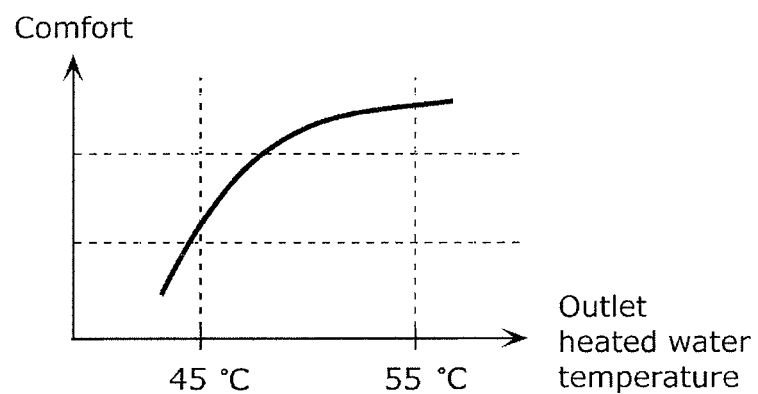
FIG. 14A shows the relationship between the outlet heated water temperature and comfort.
Figure 14B:
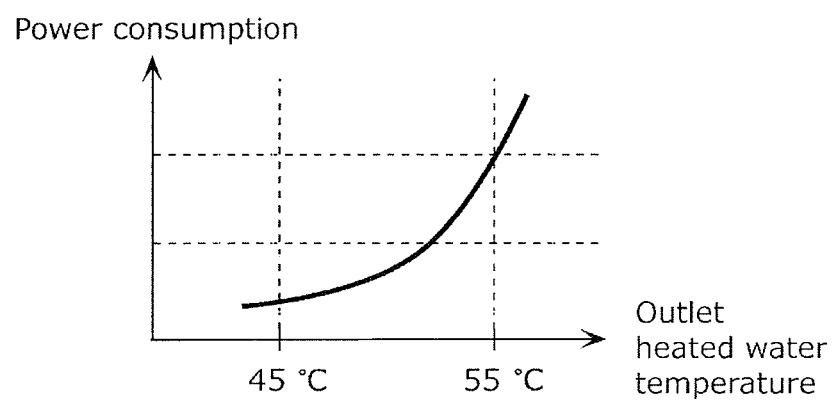
FIG. 14B shows the relationship between the outlet heated water temperature and the heat pump power consumption.

FIG. 14A shows the relationship between outlet heated water temperature and comfort. FIG. 14B shows the relationship between outlet heated water temperature and heat pump 101 power consumption. As FIG. 14A and FIG. 14B show, the higher the outlet heated water temperature, the higher the comfort and power consumption become. In other words, a positive correlation exists between outlet heated water temperature and comfort, and between outlet heated water temperature and power consumption.

However, as FIG. 14A shows, when the outlet heated water temperature is relatively low (around 45 degrees Celsius), comfort varies drastically, but when the outlet heated water temperature is relatively high (around 55 degrees Celsius), comfort remains relatively constant. Conversely, as FIG. 14B shows, when the outlet heated water temperature is relatively high (around 55 degrees Celsius), the heat pump 101 power consumption varies drastically, but when the outlet heated water temperature is relatively low (around 45 degrees Celsius), power consumption remains relatively constant. In other words, the relationship between comfort and outlet heated water temperature and the relationship between power consumption and outlet heated water temperature vary greatly. Therefore, the third embodiment uses the above relationships to select an outlet heated water temperature (the second temperature) for the OM period so that the balance between comfort and power consumption is optimal.

Figures 15, 16:
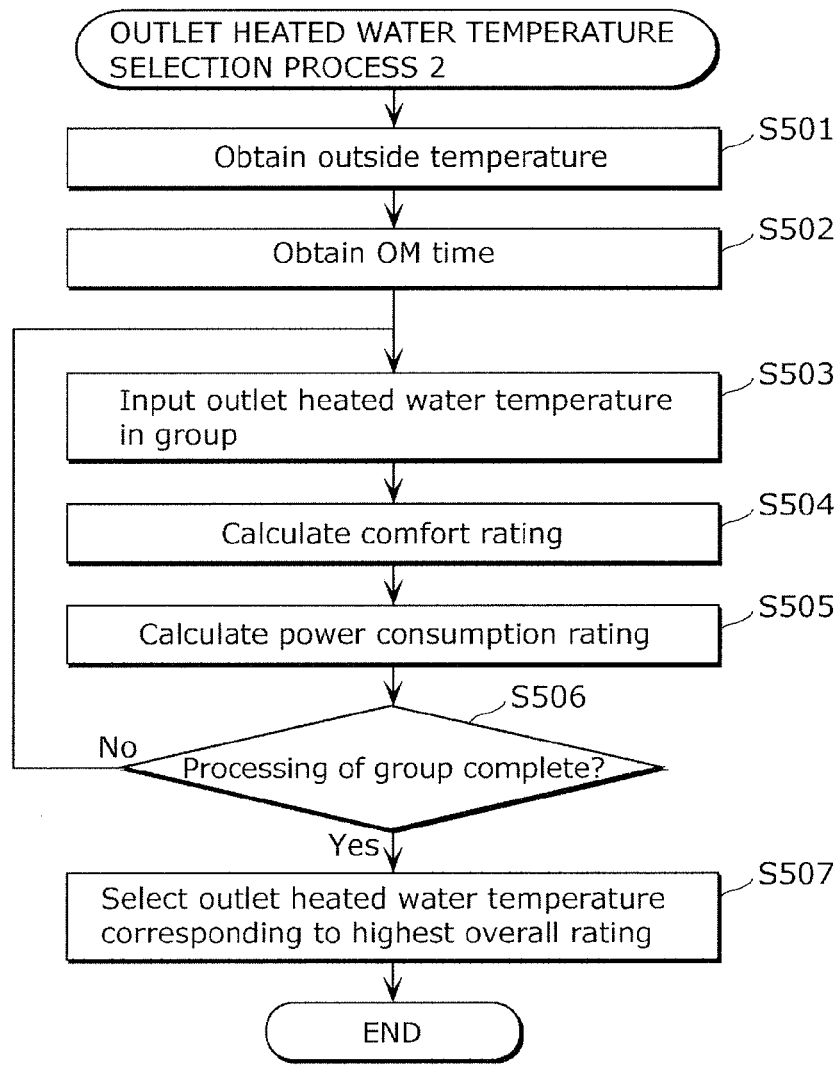
FIG. 15 is a flowchart of an outlet heated water temperature selection process according to the third embodiment.
FIG. 16 is a table in which a plurality of combinations of the outlet heated water temperature, the sensible temperature, and the heat pump power consumption are associated with the outside temperature and the OM time.

FIG. 15 is a flowchart of an outlet heated water temperature selection process (S202 in FIG. 5A) according to the third embodiment. It is to be noted that since the overall flow of heat pump control process is similar to that of FIG. 5A, the explanation of the third embodiment will focus on the points of difference with the first and second embodiments, and details regarding common points will be omitted.

As FIG. 15 shows, the operation control unit 83 obtains, via the state detecting unit 81, the outside temperature detected by the outside temperature detecting unit 105 (S501). Moreover, the operation control unit 83 obtains the OM time from the OM signal received by the communication unit 82 (S502).

Next, the operation control unit 83 performs steps S503 through S506 on all columns in FIG. 16 corresponding to the outlet heated water temperature corresponding to the outside temperature obtained in step S501, the OM time obtained in step S502, and the combination of the outside temperature and the OM time.

FIG. 16 is a table in which a plurality of combinations of sensible temperature and heat pump 101 power consumption (output information) are each associated with an outside temperature, an OM time, and an outlet heated water temperature (input information). It is to be noted that sensible temperature is an estimated value of what the temperature "feels like" at the end of the OM period. This value increases as the outlet heated water temperature (the second temperature) increases. A higher value also translates to a higher level of comfort.

In the third embodiment, this sensible temperature is used as the barometer of comfort, but it goes without saying that the second temperature itself may be used instead. Moreover, other than sensible temperature, a discomfort index, effective temperature, or an estimated average chill factor, for example, may be used as the barometer for comfort.

This sensible temperature can be calculated, for example, using Equation 1 shown below. It is to be noted that in Equation 1, $t_0$ represents sensible temperature (degrees Celsius), $h_c$ represents convective heat transfer (W/(m²×degrees Celsius)), $h_r$ represents radiant heat transfer (W/(m²×degrees Celsius)), $t_a$ represents room temperature (degrees Celsius), and $t_r$ represents average radiated temperature (degrees Celsius).

[Math 1]

$$t_0 = \frac{h_c t_a + h_r t_r}{h_c + h_r} \qquad \text{(Equation 1)}$$

FIG. 16 shows the sensible temperature and the power consumption for a plurality of different outlet heated water temperatures when the outside temperature is −20 degrees Celsius and the OM time is two hours. That is to say, when the outside temperature obtained in step S501 is −20 degrees Celsius, the OM time obtained in S502 is two hours, and the outlet heated water temperature is to be continuously changed, the operation control unit 83 performs step S504 and step S505 shown in FIG. 15 with respect to each column shown in FIG. 16 corresponding with this input information.

First, the operation control unit 83 obtains the sensible temperature and the power consumption as output information by inputting, in the table shown in FIG. 16, the first combination of the outside temperature, the OM time, and the outlet heated water temperature as input information (S503). For example, by inputting, as the input information, an outside temperature of −20 degrees Celsius, an OM time of two hours, and an outlet heated water temperature of 35 degrees Celsius, a sensible temperature of 10.0 degrees Celsius and a power consumption of 3000 W can be obtained as the output information.

Next, the operation control unit 83 calculates the comfort rating (S504). The comfort rating is indicative of the level of comfort in the room in which the heating device 103 is installed. The higher the rating, the higher the level of comfort is. As such, a low rating is indicative of discomfort. This comfort rating can be obtained, for example, by assigning the sensible temperature obtained in step S503 from the table shown in FIG. 16 to the x axis of the graph shown in FIG. 17A.

Figure 17A:
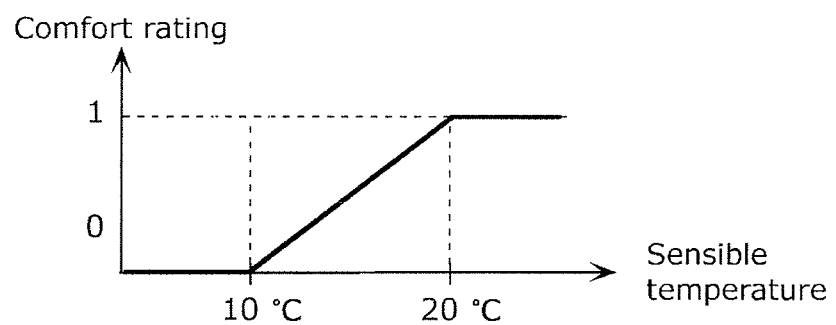
FIG. 17A is a graph showing the relationship between sensible temperature and the comfort rating.

FIG. 17A is a graph showing the relationship between sensible temperature and comfort rating. The relationship is predetermined so that the sensible temperature increases with the comfort rating. It is to be noted that in FIG. 17A, the relationship between the sensible temperature and the comfort rating is linear, but it goes without saying that a non-linear relationship is acceptable.

Next, the operation control unit 83 calculates the power consumption rating (S505). The power consumption rating is used as a barometer for the degree of reduction in power consumption. This rating increases with the power consumption reduction amount. As such, a low rating indicates a low amount of power consumption reduction. This power consumption rating can be obtained, for example, by assigning the power consumption obtained in step S503 from the table shown in FIG. 16 to the x axis of the graph shown in FIG. 17B.

Figure 17B:
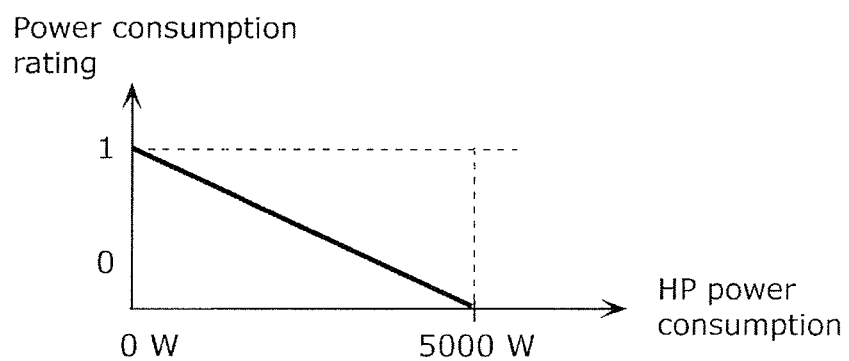
FIG. 17B is a graph showing the relationship between the heat pump power consumption and the power consumption rating.

FIG. 17B is a graph showing the relationship between the power consumption of the heat pump 101 and the power consumption rating. The relationship is predetermined so that the power consumption rating increases as the power consumption decreases. It is to be noted that in FIG. 17B, the relationship between the power consumption and the power consumption rating is linear, but it goes without saying that a non-linear relationship is acceptable.

Next, the operation control unit 83 confirms whether the processes in steps S503 through S505 have been performed on each column applicable for processing in the graph in FIG. 16 (S506). If there are still columns left to be processed (no in S506), the operation control unit 83 then performs the processes in steps S503 through S505 on the next column. On the other hand, if there are no columns left to be processed (yes in S506), then the processing proceeds to step S507.

Figure 18:
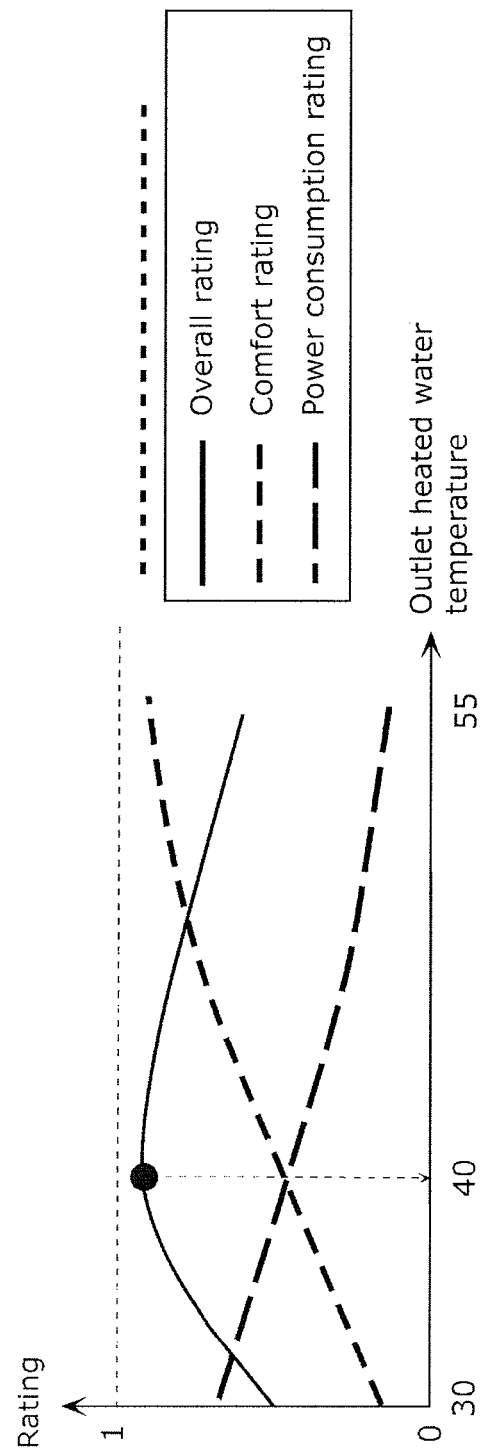
FIG. 18 shows the association between a rating and the outlet heated water temperature.

The relationship between the rating calculated for each column in FIG. 16 and the corresponding outlet heated water temperature is shown in FIG. 18. In FIG. 18, the short dashed line represents the relationship between the comfort rating and the outlet heated water temperature, the long dashed line represents the relationship between the power consumption rating and the outlet heated water temperature, and the solid line represents the relationship between the overall rating and the outlet heated water temperature. The overall rating is a weighted sum of the comfort rating and the power consumption rating corresponding to a single outlet heated water temperature. The overall rating can be calculated with Equation 2 shown below, for example.

$$\text{overall rating} = \text{comfort rating} \times \alpha + \text{power consumption rating} \times \beta \quad \text{(Equation 2)}$$

It is to be noted that $\alpha$ and $\beta$ in Equation 2 are weighting coefficients. By making $\alpha=\beta=0.5$, the overall rating can be calculated by simple arithmetic average of the comfort rating and the power consumption rating. On the other hand, taking into consideration the magnitude of the power usage for that given day, the energy supplier 4 may determine $\alpha$ and $\beta$ and include them in the sent OM signal. For example, when the peak power usage is high (in other words when it is necessary to reduce power consumption by a great amount), $\alpha$ may be made to be less than $\beta$, and when the peak power usage is low (in other words when it is not so necessary to reduce power consumption), $\alpha$ may be made to be greater than $\beta$.

The operation control unit 83 then selects the outlet heated water temperature corresponding to the highest overall rating as the second temperature (S507). That is to say, in the example shown in FIG. 18, the outlet heated water temperature that would be selected as the second temperature is 40 degrees Celsius.

With this, a high level of comfort and reduction of the power consumption can be achieved in a balanced manner by selecting the outlet heated water temperature having the highest overall rating, which is a sum of the comfort rating and the power consumption rating.

It is to be noted that, similar to the example above, when the outside temperature and the OM time are used as input information in the table in FIG. 16, the table is designed on the assumption that general values are set for other information (for example, home thermal insulation efficiency, thermal radiation efficiency of the heating device 103, inlet water temperature detected by the inlet water temperature detecting unit 108, etc.).

Moreover, similar to embodiment 1 and 2, the combinations of input information in the table shown in FIG. 16 is not limited to this example. The combination may be any given combination of, for example, outside temperature, OM time, home thermal insulation efficiency, thermal radiation efficiency of the heating device 103, and inlet water temperature detected by the inlet water temperature detecting unit 108.

[Fourth Embodiment]

Next, the control method of the heat pump according to the fourth embodiment will be explained with reference to FIG. 19 and FIG. 20. It is to be noted that the fourth embodiment is premised on the heat pump heating device 100 shown in FIG. 2, FIG. 3, and FIG. 4, but the room temperature detecting unit 106 may be omitted.

The first through third embodiments explained in detail the method of determining the outlet heated water temperature for the OM period. However, in order for the heat pump 101 to operate, a certain amount of difference in temperature between the inlet water temperature and the outlet heated water temperature is required. That is to say, when the difference between the first temperature and the second temperature is great, it is not preferable to abruptly adjust the outlet heated water temperature. For this reason, a method for gradually decreasing the outlet heated water temperature from the first temperature to the second temperature in accordance with the difference between the inlet water temperature and the outlet heated water temperature will be described here in the fourth embodiment. Here, the difference between the inlet water temperature and the outlet heated water temperature is expressed as $\Delta T$, the minimum permissible value of $\Delta T$ is expressed as $\Delta Tmin$, and the maximum permissible value of $\Delta T$ is expressed as $\Delta Tmax$.

Figure 19:
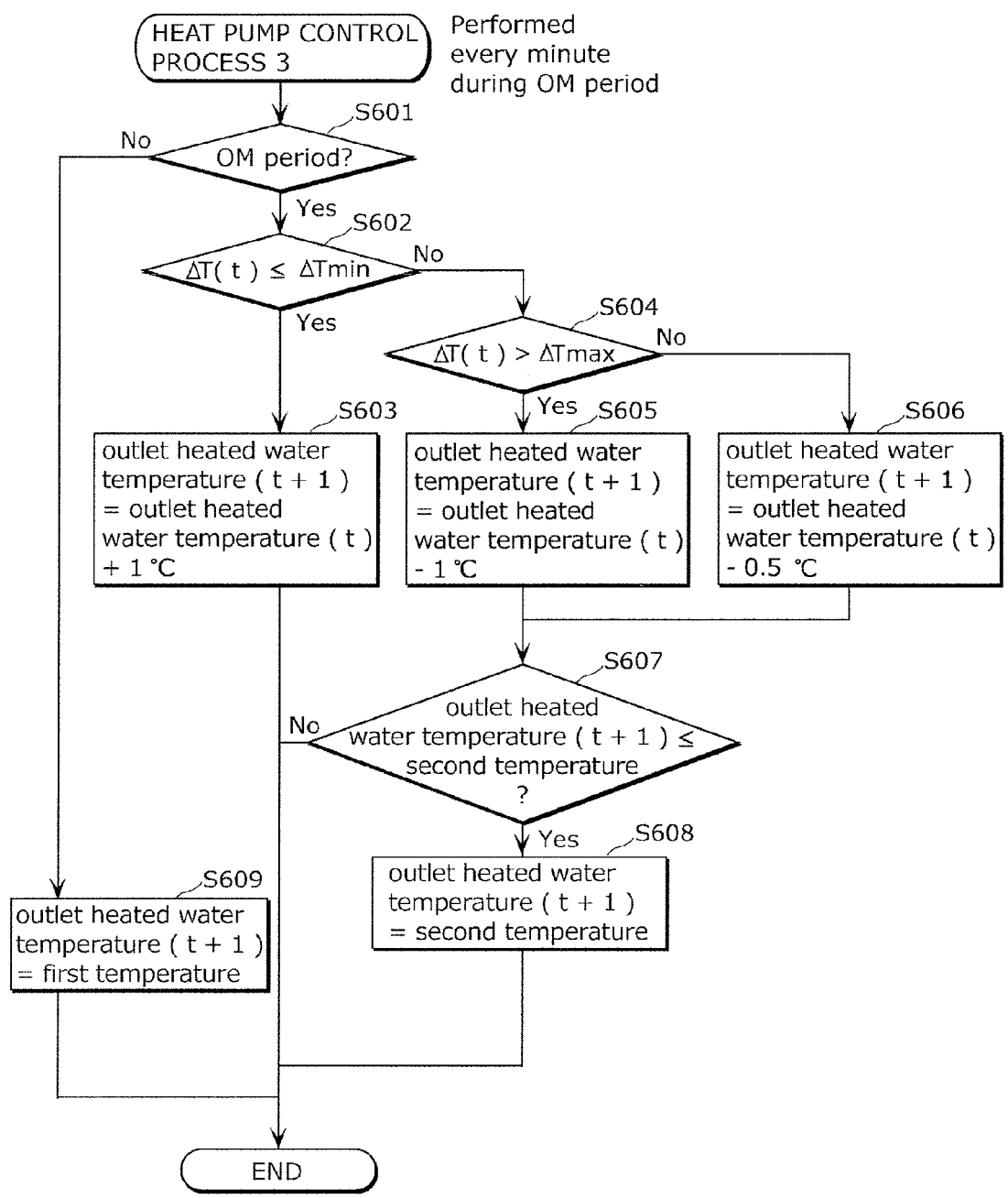
FIG. 19 is a flow chart of the heat pump control process according to the fourth embodiment.

FIG. 19 is a flow chart of the heat pump control process according to the fourth embodiment. It is to be noted that the flow chart in FIG. 19 is typically a process performed after the selection (determination) of the second temperature performed in step S202 in FIG. 5A. Moreover, the two thresholds used in the example shown in FIG. 19 are $\Delta Tmin=3.5$ and $\Delta Tmax=7$, but this example is not intended to be limiting.

The operation control unit 83 repeats steps S601 through S608 every minute from the beginning to the end of the OM period. That is to say, "every minute" specifically means that the heat pump control process 3 is repeated each minute. For example, when the start time of the OM period is 18:00 and the end time is 20:00, the process is performed at 18:00, 18:01, 18:02, etc., until 20:00. This process gradually adjusts the outlet heated water temperature in accordance with the difference between the inlet water temperature and the outlet heated water temperature. It is to be noted that in the following description, values with "(t)" added denote values at a certain point in time t (minute).

First, the operation control unit 83 determines whether the current time falls within the OM period (S601). When the current time falls within the OM period (yes in S601), the operation control unit 83 obtains the outlet heated water temperature (t) from the outlet heated water temperature detecting unit 107 and the inlet water temperature (t) from the inlet water temperature detecting unit 108 via the state detecting unit 81. The operation control unit 83 then compares the predetermined ΔTmin with the ΔT (t) calculated by subtracting the inlet water temperature from the outlet heated water temperature (S602).

When ΔT (t)≤ΔTmin (yes in S602), the operation control unit 83 calculates a new outlet heated water temperature (t+1) by increasing the current outlet heated water temperature (t) by one degree Celsius (S603). The result of "yes" in step S602 is indicative of an extremely low difference between the inlet water temperature and the outlet heated water temperature. The outlet heated water temperature is temporarily increased to prevent from the heat pump 101 from shutting off. The amount of increase in outlet heated water temperature, however, is not limited to the above example (one degree Celsius).

On the other hand, when ΔT (t)>ΔTmin (no in S602), the operation control unit 83 compares the ΔT (t) with the predetermined ΔTmax (S604). When ΔT (t)>ΔTmax (yes in S604), the ΔT (t) is too high. As such, the operation control unit 83 calculates a new outlet heated water temperature (t+1) by decreasing the current outlet heated water temperature (t) by one degree Celsius (S605). On the other hand, when ΔT (t)≤ΔTmax (no in S604), the ΔT (t) is within the permissible range. As such, the operation control unit 83 calculates a new outlet heated water temperature (t+1) by decreasing the current outlet heated water temperature (t) by only 0.5 degrees Celsius (S606). The amount of decrease in outlet heated water temperature, however, is not limited to the above example (one degree Celsius and 0.5 degrees Celsius).

The result of "no" in step S602 is indicative of a certain degree of difference between the inlet water temperature and the outlet heated water temperature. As such, the new outlet heated water temperature (t+1) is made to be lower than the current outlet heated water temperature (t). If the difference between the inlet water temperature and the outlet heated water temperature is extremely large at this time (yes in S604), a relatively large amount of decrease (one degree Celsius) is used in order to quickly bring the outlet heated water temperature up to the second temperature (S605). On the other hand, when the difference between the inlet water temperature and the outlet heated water temperature is not so large (no in S604), a relatively small amount of decrease (0.5 degrees Celsius) is used to keep the operation of the heat pump 101 stable (S606).

Next, the operation control unit 83 compares the outlet heated water temperature calculated in step S605 or step S606 with the second temperature calculated in the first through third embodiments (S607). When outlet heated water temperature (t+1)≤second temperature (yes in S607), the operation control unit 83 makes the outlet heated water temperature (t+1) the second temperature (S608). In other words the new outlet heated water temperature (t+1) is brought up to the target temperature, the second temperature. On the other hand, when the result is "no" in step S607, the outlet heated water temperature (t+1) set in step S605 or step S606 is left unchanged as the outlet heated water temperature.

However, in step S601, when the current time is not within the OM period (no in S601), the operation control unit 83 sets the new outlet heated water temperature (t+1) to the first temperature set by the user (S609). It is to be noted that step S609 is only performed once, at the end of the OM period (in this example, at 20:00).

The operation control unit 83 then determines operation conditions to achieve the outlet heated water temperature (t+1) calculated in any of steps S603, S605, S606, S08, or S609, and transmits the determined operation conditions to the HP control unit 104 via the control instruction unit 85. The HP control unit 104 then controls operation of the heat pump 101 according to the received operation conditions.

The above process will now be explained with reference to FIG. 20. It is to be noted that the example shown in FIG. 20 is based on the presumption that the first temperature is 55 degrees Celsius and the OM period start time is 18:00. Moreover, in FIG. 20, the diamonds (short dashed line) represent the outlet heated water temperature detected by the outlet heated water temperature detecting unit 105, the squares (long dashed line) represent the inlet water temperature detected by the inlet water temperature detecting unit 106, and the triangles (solid line) represent the difference between the outlet heated water temperature and the inlet water temperature.

Figure 20:
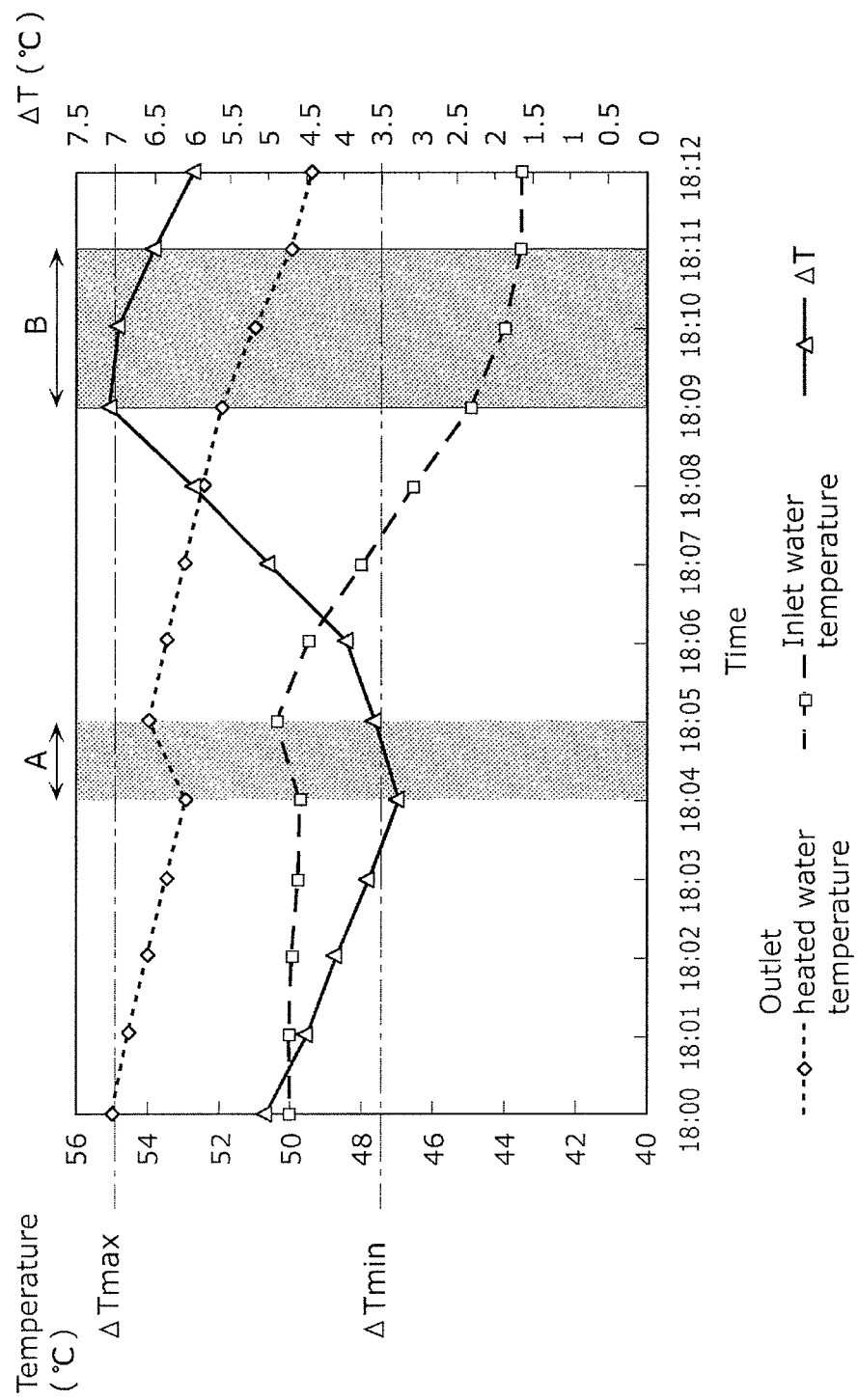
FIG. 20 shows a shift in various temperatures according to the fourth embodiment.

As FIG. 20 shows, the outlet heated water temperature is gradually decreased from 18:00 to 18:04 (S606 in FIG. 19). However, because ΔT at 18:04 is below ΔTmin, the outlet heated water temperature is temporarily increased from 18:04 to 18:05 (region A on the left in FIG. 20) (S603).

Moreover, the outlet heated water temperature is gradually decreased from 18:05 to 18:09 (S606 in FIG. 19). Then, since ΔT from 18:09 to 18:10 exceeds ΔTmax, the outlet heated water temperature is made to decrease more sharply than other time periods from roughly 18:09 to 18:11 (region B on the right in FIG. 20) (S605 in FIG. 19).

In this way, the heat pump 101 can be kept from completely shutting off and the outlet heated water temperature can be made to decrease from the first temperature to the second temperature by gradually making the outlet heated water temperature decrease while checking the difference in temperature between the outlet heated water temperature and the inlet water temperature.

It is to be noted that in the example in FIG. 19, the calculation method of the new outlet heated water temperature (t+1) is changed depending on the comparison result of the difference ΔT (t) between the outlet heated water temperature and the inlet water temperature, and the two thresholds (ΔTmin and ΔTmax). However, this example is not intended to be limiting.

For example, from the perspective of preventing the heat pump 101 from completely shutting off, as a bare minimum, only the minimum value ΔTmin for the temperature difference ΔT (t) may be used. More specifically, step S604 and step S606 may be omitted in FIG. 19, and step S605 may be performed when "no" in step S602.

Moreover, three or more thresholds may be used, and the calculation method of the new outlet heated water temperature (t+1) may be segmentalized. With this, the amount of variation of the outlet heated water temperature can be adequately set according to the current condition (the temperature difference ΔT (t)).

[Fifth Embodiment]

Next, the control method of the heat pump according to the fifth embodiment will be explained with reference to FIG. 21 and FIG. 22. It is to be noted that the fifth embodiment is premised on the heat pump heating device 100 shown in FIG. 2, FIG. 3, and FIG. 4, but the outside temperature detecting unit 105, the outlet heated water temperature detecting unit 107, the inlet water temperature detecting unit 108, and the heater 109 may be omitted.

Examples in which the second temperature was determined prior to the start time of the OM period were used for the first through fourth embodiments. However, in the first through fourth embodiments, the actual level of comfort during the OM period is not taken into consideration. As such, in the fifth embodiment, the amount of decrease per unit time in the temperature of the room in which the heating device 103 is installed is used as a barometer of actual comfort during the OM period. The method of gradually reducing the outlet heated water temperature according to this barometer of comfort is will be described hereinafter.

Figure 21:
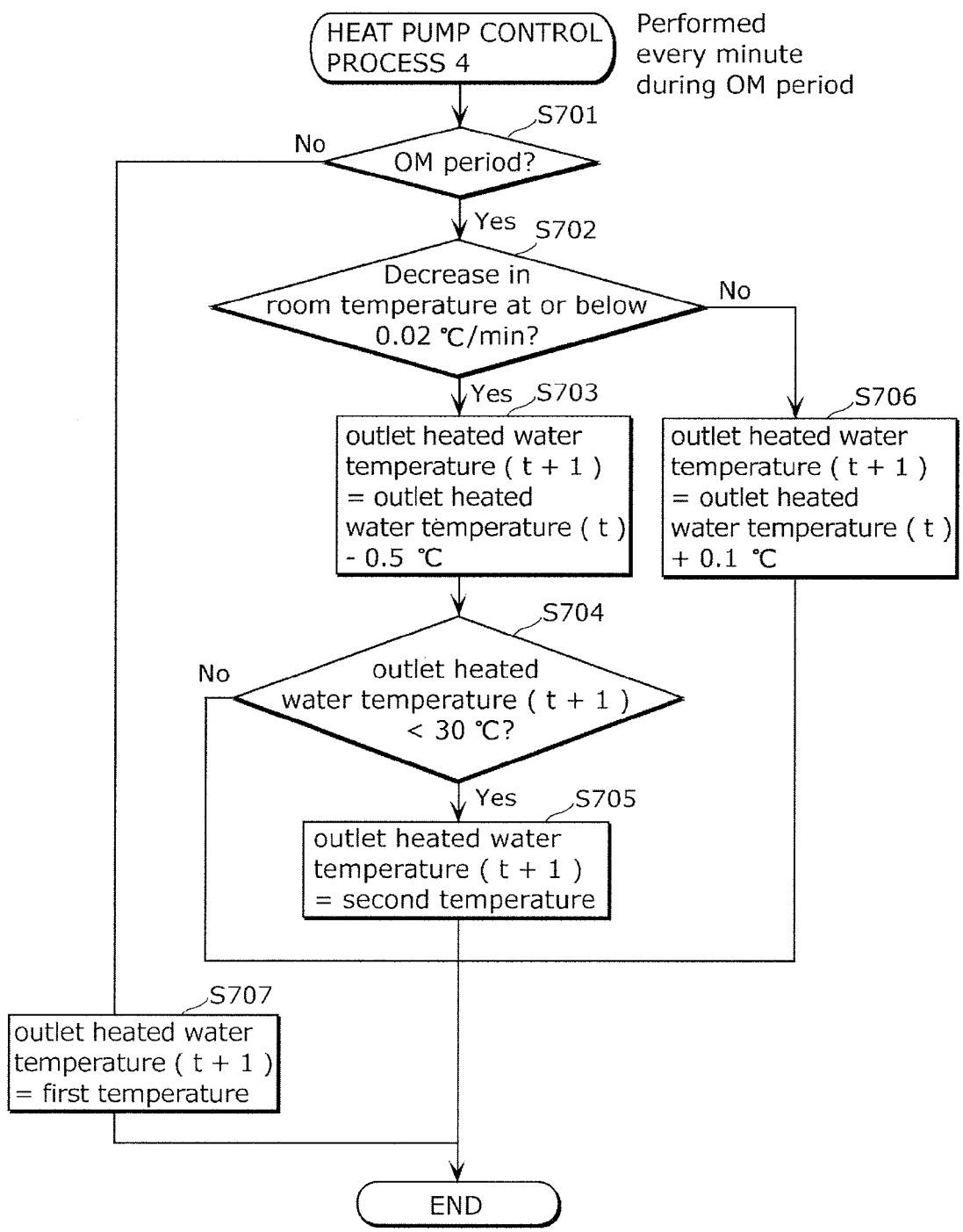
FIG. 21 is a flow chart of the heat pump control process according to the fifth embodiment.

FIG. 21 is a flow chart of the heat pump control process according to the fifth embodiment. It is to be noted that in this embodiment, the threshold is 0.02 degrees Celsius per minute, the amount of decrease in outlet heated water temperature (the first amount of variation) is 0.5 degrees Celsius, and the amount of increase in the outlet heated water temperature (the second amount of variation) is 0.1 degrees Celsius. However, these values are merely examples, and are not intended to be limiting. That being said, the amount of increase in the outlet heated water temperature is to be set lower than the amount of decrease.

The operation control unit 83 repeats steps S701 through S706 in FIG. 21 every minute from the beginning to the end of the OM period. That is to say, "every minute" specifically means that the heat pump control process 4 is repeated each minute. For example, when the start time of the OM period is 18:00 and the end time is 20:00, the process is performed at 18:00, 18:01, 18:02, etc., until 20:00. This process gradually adjusts the outlet heated water temperature in accordance with the amount of decrease per unit time in room temperature. It is to be noted that in the following description, values with "(t)" added denote values at a certain point in time t (minute).

First, the operation control unit 83 determines whether the current time falls within the OM period (S701). When the current time falls within the OM period (yes in S701), the operation control unit 83 obtains the temperature (t) of the room in which the heating device 103 is installed (room temperature (t)) from the room temperature detecting unit 106 via the state detecting unit 81. The operation control unit 83 then compares the amount of decrease per unit time in room temperature (room temperature decrease) and a predetermined threshold (0.02 degrees Celsius per minute) (S702). Here, the threshold is a numerical value indicative of the boundary between comfort and discomfort. That is to say, an amount of decrease per unit time in room temperature at below the threshold is deemed to be in the comfort zone, and an amount of decrease per unit time in room temperature greater than the threshold is deemed to be out of the comfort zone.

It is to be noted that the room temperature decrease can be calculated as the difference between the most recently obtained room temperature (t) and the previously (one minute prior) obtained room temperature (t−1), for example. However, the decrease in room temperature does not follow the changes in outlet heated water temperature in real time, but lags behind a little. As such, the room temperature decrease may be calculated by, for example, dividing the difference between the current room temperature (t) and the room temperature from n minutes ago (room temperature (t−n) by n. That is to say, the room temperature decrease may be equal to: (room temperature (t)−room temperature (t−n))/n. The value of n is not intended to be particularly limiting, but may be, for example, from two to 10 minutes, and more preferably, from about 3 to 5 minutes.

When room temperature decrease ≤0.02 degrees Celsius (yes in S702), the operation control unit 83 calculates a new outlet heated water temperature (t+1) by decreasing the current outlet heated water temperature (t) by 0.5 degrees Celsius (S703). The result of "yes" in step S702 is indicative of an extremely low room temperature decrease per unit time. That is to say, the outlet heated water temperature is made to reduce since it is determined that a high level of comfort can be maintained.

Next, the operation control unit 83 compares the outlet heated water temperature (t+1) calculated in step S703 with the minimum outlet heated water temperature value (30 degrees Celsius) predetermined by the capability of the heat pump 101 (S704). When the outlet heated water temperature (t+1) is below 30 degrees Celsius (yes in S704), the operation control unit 83 makes the outlet heated water temperature (t+1) to be 30 degrees Celsius (S705).

On the other hand, when room temperature decrease >0.02 degrees Celsius per minute (no in S702), the operation control unit 83 calculates a new outlet heated water temperature (t+1) by increasing the current outlet heated water temperature (t) by 0.1 degrees Celsius (S706). The result of "no" in step S702 is indicative of an extremely high room temperature decrease per unit time.

That is to say, the outlet heated water temperature is made to increase since it is determined that the level of comfort is decreasing.

However, in step S701, when the current time is not within the OM period (no in S701), the operation control unit 83 sets the new outlet heated water temperature (t+1) to the first temperature set by the user (S707). It is to be noted that step S707 is only performed once, at the end of the OM period (in this example, at 20:00).

The operation control unit 83 then determines operation conditions to achieve the outlet heated water temperature (t+1) calculated in any of steps S703, S705, S706, or S707, and transmits the determined operation conditions to the HP control unit 104 via the control instruction unit 85. The HP control unit 104 then controls operation of the heat pump 101 according to the received operation conditions.

The above process will now be explained with reference to FIG. 22. It is to be noted that the example shown in FIG. 22 is based on the presumption that the first temperature is 55 degrees Celsius and the OM period start time is 18:00. Moreover, the solid line represents outlet heated water temperature and the dashed line represents room temperature in FIG. 22.

Figure 22:
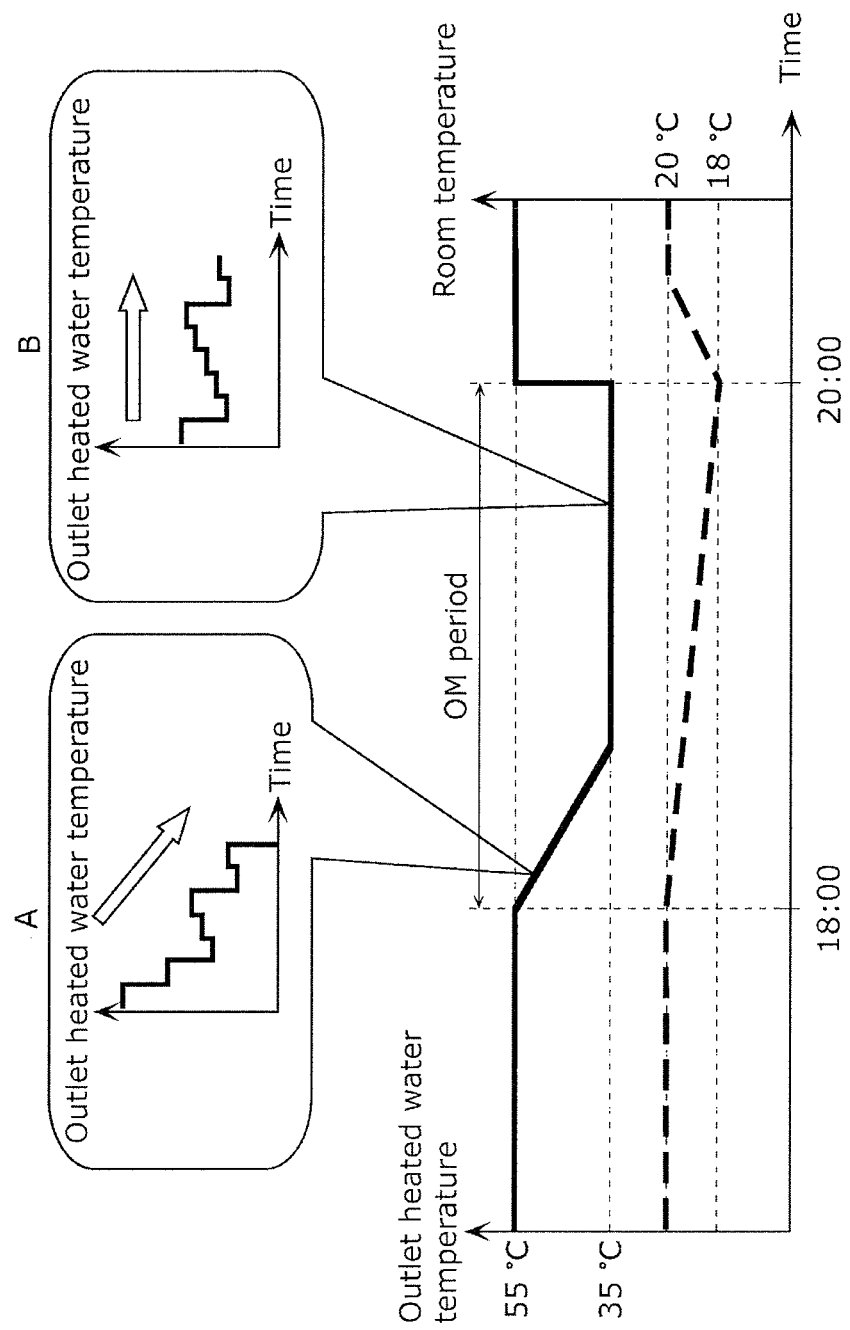
FIG. 22 shows a shift in outlet heated water temperature according to the fifth embodiment.

Looking at FIG. 22, the outlet heated water temperature that was 55 degrees Celsius at 18:00 begins to gradually decrease thereafter, eventually reaching 35 degrees Celsius. Up until this point, as the bubble A on the left of FIG. 2 shows, instances in which the outlet heated water temperature is decreased (S703 in FIG. 21) outnumber the instances in which it is increased (S706 in FIG. 21), resulting in an overall gradual decrease in outlet heated water temperature. In other words, the bubble A shows that, up until that point, the instances which the room temperature decrease per unit time is below the threshold are great in number.

On the other hand, after the outlet heated water temperature reaches 35 degrees Celsius, as the bubble B on the right of FIG. 22 shows, instances in which the outlet heated water temperature is increased (S706 in FIG. 21) outnumber the instances in which it is decreased (S703 in FIG. 21), resulting in a nearly constant outlet heated water temperature. In other words, the bubble B shows that hereinafter the instances which the room temperature decrease per unit time is above the threshold are great in number.

In this way, the outlet heated water temperature can be returned to a value when the amount of decrease in room temperature increases by gradually reducing the outlet heated water temperature while monitoring the amount of decrease in room temperature per unit time. That is to say, the outlet heated water temperature can be adequately adjusted based on an actual comfort level without predetermining the second temperature.

[Variation of Fifth Embodiment]

Next, the control method of the heat pump according to a variation of the fifth embodiment will be explained with reference to FIG. 23. This variation is an example which uses a plurality of thresholds to calculate a new outlet heated water temperature (t+1).

Figure 23:
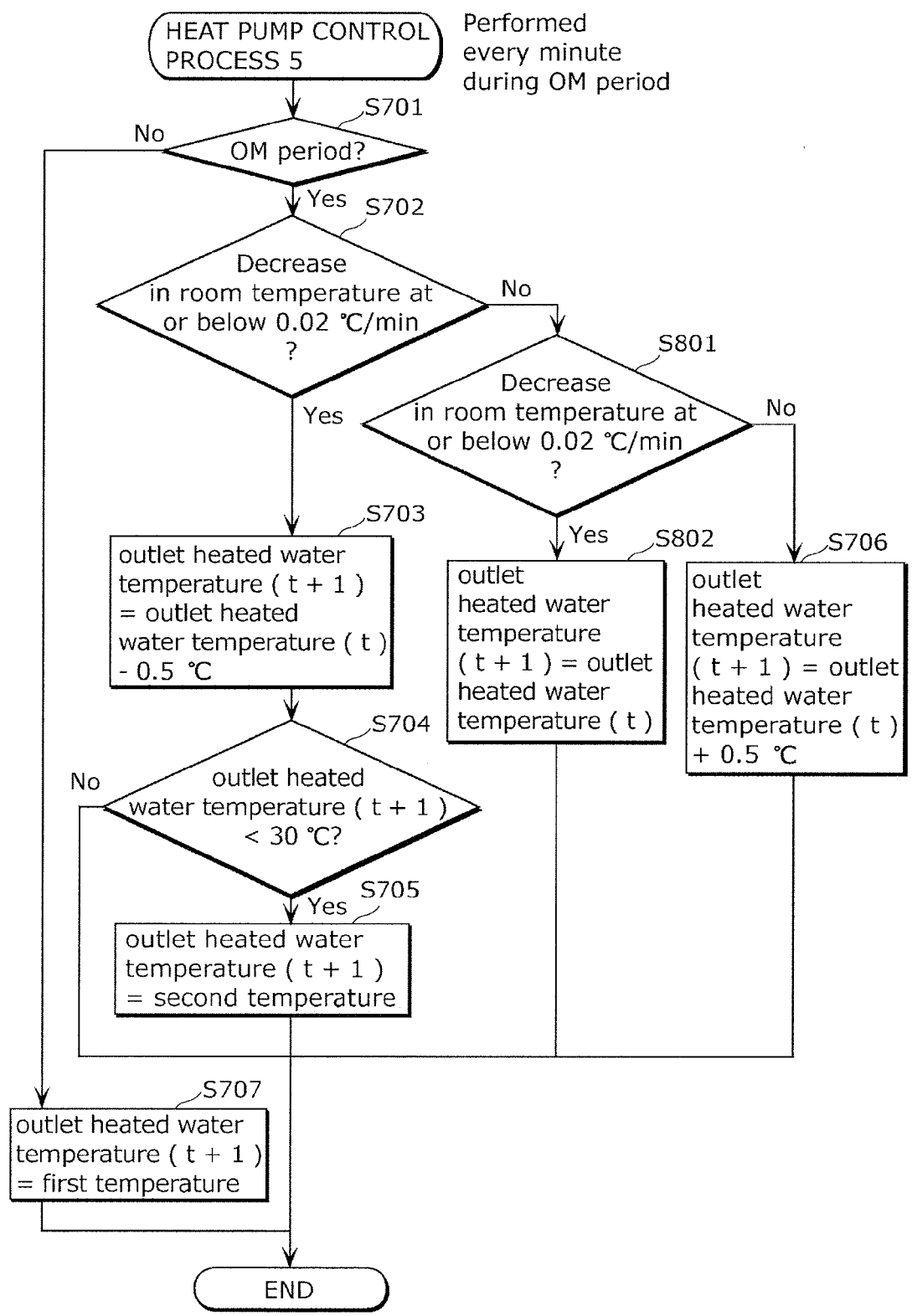
FIG. 23 is a flow chart of the heat pump control process according to a variation of the fifth embodiment.

FIG. 23 is a flow chart of the heat pump control process according to the variation of the fifth embodiment. It is to be noted that in this variation, the first threshold is 0.015 degrees Celsius per minute, the second threshold is 0.02 degrees Celsius per minute, the amount of decrease in outlet heated water temperature (the first amount of variation) is 0.5 degrees Celsius, and the amount of increase in the outlet heated water temperature (the second amount of variation) is 0.1 degrees Celsius. However, these values are merely examples, and are not intended to be limiting. Since the steps common with FIG. 21 share the same reference numbers, detailed explanations thereof will be omitted.

The heat pump control process shown in FIG. 23 is difference from FIG. 21 in that it includes two thresholds for adjusting the outlet heated water temperature (the first and second thresholds), and uses different methods of calculating the outlet heated water temperature for each of the following cases: (i) when the room temperature decrease per unit time is at or below the first threshold; (ii) when the room temperature decrease per unit time is greater than the first threshold and less at or below the second threshold; and (iii) when the room temperature decrease per unit time is greater than the second threshold.

Specifically, when the room temperature decrease per unit time is 0.015 degrees Celsius per minute (first threshold) or lower (yes in S702), the operation control unit 83 calculates a new outlet heated water temperature (t+1) by decreasing the outlet heated water temperature (t) by 0.5 degrees Celsius in order to make the room temperature decrease extremely small (in other words, comfortable) (S703).

Moreover, when the room temperature decrease per unit time is greater than 0.015 degrees Celsius per minute (no in S702) and is 0.02 degrees Celsius per minute (second threshold) or lower (yes in S801), the operation control unit 83 maintains the current outlet heated water temperature (t) in order to keep the room temperature decrease small (in other words, maintain comfort) (S802). That is to say, outlet heated water temperature (t+1)=outlet heated water temperature (t).

Furthermore, when the room temperature decrease per unit time exceeds 0.02 degrees Celsius per minute (no in S801), the operation control unit 83 calculates a new outlet heated water temperature (t+1) by adding 0.5 degrees Celsius to the current outlet heated water temperature (t) in order to make the room temperature decrease larger (that is, make the room uncomfortable).

In other words, with the process performed every minute shown in FIG. 21, the outlet heated water temperature is made to either decrease (S703 in FIG. 21) or increase (S706 in FIG. 21). On the other hand, since the process shown in FIG. 23 adds a step in which the outlet heated water temperature is not adjusted (S802 in FIG. 23), the fluctuation in the outlet heated water temperature is smooth compared to the process in FIG. 21.

[Other Embodiments]

It should be noted that although the present invention was described based on the previous embodiments, the present invention is not limited to these embodiments. The following examples are also intended to be included within the scope of the present invention.

Each of the preceding devices is, specifically, a computer system configured from a microprocessor, ROM, RAM, a hard disk unit, a display unit, a keyboard, and a mouse, for example. A computer program is stored in the RAM or the hard disk unit. Each of the devices achieves its function as a result of the microprocessor operating according to the computer program. Here, the computer program is configured of a plurality of pieced together instruction codes indicating a command to the computer in order to achieve a given function.

A portion or all of the components of each of the preceding devices may be configured from one system LSI (Large Scale Integration). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function as a result of the microprocessor operating according to the computer program.

A portion or all of the components of each of the preceding devices may each be configured from a detachable IC card or a stand-alone module. The IC card and the module are computer systems configured from a microprocessor, ROM, and RAM, for example. The IC card and the module may include the super-multifunction LSI described above. The IC card and the module achieve their function as a result of the microprocessor operating according to a computer program. The IC card and the module may be tamperproof.

The present invention may be a method shown above. Moreover, the present invention may also be a computer program realizing these methods with a computer, or a digital signal of the computer program.

Moreover, the present invention may also be realized as the computer program or the digital signal stored on storage media readable by a computer, such as a flexible disk, hard disk, CD-ROM, MO, DVD, DVD-ROM, DVD-RAM, BD (Blu-ray Disc), or a semiconductor memory. The present invention may also be the digital signal stored on the above mentioned storage media.

Moreover, the present invention may also be realized by transmitting the computer program or the digital signal, for example, via an electric communication line, a wireless or wired line, a network such as the Internet, or data broadcasting.

Moreover, the present invention may be a computer system including memory storing the computer program and a microprocessor operating according to the computer program.

Moreover, the computer program or the digital signal may be implemented by an independent computer system by being stored on the storage media and transmitted, or sent via the network.

The preceding embodiments and the preceding transformation examples may be individually combined.

Hereinbefore, the embodiments of the present invention were described with reference to the drawings, but the present invention is not limited to the embodiments depicted in the drawings. It is acceptable to add variations to or modify the embodiments depicted in the drawings within the scope of the invention or an equal scope.

INDUSTRIAL APPLICABILITY

The present invention can be used advantageously in a heating system including a heat pump.

REFERENCE SIGNS LIST 1 heat pump heating system
4 energy supplier
5 electric load
6 first power meter
7 second power meter
8 heating system control unit
81 state detecting unit
82 communication unit
83 operation control unit
84 control switching unit
85 control instruction unit
86 memory unit
100 heat pump heating device
101 heat pump
102 heat exchanger
103 heating device
104 HP control unit
105 outside temperature detecting unit
106 room temperature detecting unit
107 outlet heated water temperature detecting unit
108 inlet water temperature detecting unit
109 heater
110 water pump

The invention claimed is:

1. A method of controlling a heating system that is installed in a building and operates using power supplied from a power supply source, the heating system including:
   a heat pump that generates heat using the power supplied from the power supply source, heats water flowing in the heat pump with the generated heat, and outputs the heated water;
   a radiator that is installed in a room, and radiates the heat generated by the heat pump; and
   a memory that stores a temperature settings table including first associated information sets, each set including an outside temperature and an outlet temperature in association with each other, the first associated information sets being determined to prevent a temperature of the room from dropping below a predetermined minimum temperature during an output modulation period, the outside temperature being a temperature outside the building in which the heating system is installed, the output modulation period being a period during which power consumption by the heat pump is to be reduced,
   the method of controlling the heating system comprising:
      detecting a current outside temperature;
      obtaining, from the power supply source, information specifying the output modulation period;
      controlling an amount of the heat generated by the heat pump and a temperature of the heated water output from the heat pump, based on the information specifying the output modulation period obtained from the power supply source, and the detected current outside temperature; and
      detecting an inlet water temperature and an outlet heated water temperature on a per unit time basis, the inlet water temperature being a temperature of the water flowing into the heat pump, the outlet heated water temperature being a temperature of the heated water exiting the heat pump,
   wherein, in the controlling, the heat pump is caused to:
      generate a first amount of heat per unit time and output heated water of a first temperature in a period other than the output modulation period; and
      generate a second amount of heat per unit time and output heated water of a second temperature during the output modulation period, the second amount of heat being less than the first amount of heat, the second temperature being lower than the first temperature,
   in the controlling, the temperature of the heated water exiting the heat pump is reduced from the first temperature to the second temperature, by determining whether a difference between the outlet heated water temperature and the inlet water temperature exceeds a threshold and reducing, in accordance with the difference between the inlet water temperature and the outlet heated water temperature, the temperature of the heated water exiting the heat pump each time the difference between the outlet heated water temperature and the inlet water temperature exceeds the threshold, and
   the method of controlling further comprises:
      selecting an outlet temperature from the first associated information sets, as the second temperature, the selected outlet temperature being associated with the outside temperature corresponding to the detected current outside temperature.

2. The method of controlling the heating system according to claim 1,
   wherein the memory further stores a second temperature settings table including second associated information sets, each set including the outside temperature, a length of the output modulation period, a thermal insulation efficiency of the building, and the outlet temperature in association with each other, the second associated information sets being determined to keep a decrease in the temperature of the room, in which the radiator is installed, within a predetermined range during the output modulation period, and
   in the controlling, one of the outlet temperatures is selected from the second associated information sets, as the second temperature, the selected outlet temperature being associated with the outside temperature which corresponds to the detected current outside temperature, the length of the output modulation period obtained from the power supply source, and the thermal insulation efficiency of the building being set in advance.

3. The method of controlling the heating system according to claim 1, further comprising:
   obtaining, from the power supply source, a degree of reduction in power consumption during the output modulation period,
   wherein, in the controlling, the selected outlet temperature, as the second temperature, is corrected based on the obtained degree of reduction.

4. The method of controlling the heating system according to claim 3, wherein, in the controlling,
the selected outlet temperature, as the second temperature, is corrected to a lower value when the obtained degree of reduction is greater than a predetermined criterion, and
the selected outlet temperature, as the second temperature, is corrected to a higher value when the obtained degree of reduction is less than the predetermined criterion.

5. The method of controlling the heating system according to claim 1,
wherein the memory further stores information, in which combinations of the outlet temperature and the power consumption are associated with each outside temperature, and
in the controlling,
a comfort rating and a power consumption rating are calculated for each of the combinations of the outlet temperature and the power consumption associated with the outside temperature corresponding to the detected current outside temperature, the comfort rating increasing with an increase in the outlet temperature and the power consumption rating increasing with a decrease in the power consumption,
an overall rating is calculated for each of the combinations of the outlet temperature and the power consumption, by adding the comfort rating and the power consumption rating, and
the selected outlet temperature, as the second temperature, is selected from the information stored in the memory, the selected outlet temperature being based upon a combination having a highest overall rating of the calculated overall rating for each of the combinations.

6. The method of controlling the heating system according to claim 1, further comprising:
detecting, on the per unit time basis, the temperature of the room in which the radiator is installed,
wherein, in the controlling, the temperature of the heated water exiting the heat pump is reduced by a first amount when a unit time decrease in the detected temperature of the room is less than or equal to a second threshold.

7. The method of controlling the heating system according to claim 6,
wherein, in the controlling, the temperature of the heated water exiting the heat pump is increased by a second amount when the unit time decrease in the detected temperature of the room exceeds a third threshold, the second amount being less than the first amount and the third threshold being greater than or equal to the second threshold.

8. The method of controlling the heating system according to claim 7,
wherein, in the controlling, the temperature of the heated water exiting the heat pump is maintained when the unit time decrease in the detected temperature of the room exceeds the second threshold and is less than or equal to the third threshold.

9. The method of controlling the heating system according to claim 1,
wherein the heating system further includes a heater that, when the temperature of the heated water exiting the heat pump drops below the first temperature, heats the heated water to the first temperature, and
in the controlling,
operation of the heater is permitted in the period other than the output modulation period, and
operation of the heater is restricted during the output modulation period.

10. The method of controlling the heating system according to claim 1,
wherein the heating system further includes a water pump which adjusts an amount of the water flowing in the heat pump, and
the inlet water temperature is detected before the water pump flows the water into the heat pump.

11. The method of controlling the heating system according to claim 1, further comprising:
repeating the detecting of the inlet water temperature and the outlet heated water temperature each unit time,
wherein, in the controlling, the temperature of the heated water exiting the heat pump is gradually reduced from the first temperature to the second temperature during the repeating.

12. The method of controlling the heating system according to claim 1,
wherein the temperature of the heated water exiting the heat pump is reduced by a fixed amount each time the difference between the outlet heated water temperature and the inlet water temperature exceeds the threshold.

13. The method of controlling the heating system according to claim 1,
wherein the temperature of the heated water exiting the heat pump is reduced by a set amount of degrees each time the difference between the outlet heated water temperature and the inlet water temperature exceeds the threshold.

14. A heating system that is installed in a building and operates using power supplied from a power supply source, the heating system comprising:
a heat pump configured to generate heat using power supplied from the power supply source, heat water flowing in the heat pump with the generated heat, and output the heated water;
a radiator installed in a room, the radiator configured to radiate the heat generated by the heat pump;
a communicator configured to obtain, from the power supply source, information specifying an output modulation period, during which power consumption by the heat pump is to be reduced;
a memory that stores a temperature settings table including first associated information sets, each set including an outside temperature and an outlet temperature in association with each other, the first associated information sets being determined to prevent a temperature of the room from dropping below a predetermined minimum temperature during the output modulation period, the outside temperature being a temperature outside the building in which the heating system is installed;
a detector configured to detect a current outside temperature;
an operation controller configured to control the amount of the heat generated by the heat pump and a temperature of the heated water output from the heat pump, based on the information specifying the output modulation period obtained from the power supply source, and the detected current outside temperature;
an inlet water temperature detector configured to detect an inlet water temperature on a per unit time basis, the inlet water temperature being a temperature of the water flowing into the heat pump; and
an outlet heated water temperature detector configured to detect an outlet heated water temperature on a per unit time basis, the outlet heated water temperature being a temperature of the heated water exiting the heat pump, wherein the operation controller is configured to cause the heat pump to:

generate a first amount of heat per unit time and output heated water of a first temperature in a period other than the output modulation period;

generate a second amount of heat per unit time and output heated water of a second temperature during the output modulation period, the second amount of heat being less than the first amount of heat, the second temperature being lower than the first temperature; and reduce the temperature of the heated water exiting the heat pump from the first temperature to the second temperature by determining whether a difference between the outlet heated water temperature and the inlet water temperature exceeds a threshold and reducing, in accordance with the difference between the inlet water temperature and the outlet heated water temperature, the temperature of the heated water exiting the heat pump each time the difference between the outlet heated water temperature and the inlet water temperature exceeds the threshold, and the operation controller selects, as the second temperature, an outlet temperature from the first associated information sets, the selected outlet temperature being associated with the outside temperature corresponding to the detected current outside temperature.

15. The heating system according to claim 14, wherein the memory further stores a second temperature settings table including second associated information sets, each set including the outside temperature, a length of the output modulation period, a thermal insulation efficiency of the building and the outlet temperature in association with each other, the second associated information sets being determined to keep a decrease in the temperature of the room, in which the radiator is installed, within a predetermined range during the output modulation period, and the operation controller is configured to select, from the second associated information sets stored in the memory, one of the outlet temperatures as the second temperature, the selected outlet temperature being associated with the outside temperature which corresponds to the current outside temperature detected by the detector, the length of the output modulation period obtained by the communicator from the power supply source, and the thermal insulation efficiency of the building being set in advance.

16. The heating system according to claim 14, wherein the memory further stores information, in which combinations of the outlet temperature and the power consumption are associated with each outside temperature, and the operation controller is configured to:

calculate a comfort rating and a power consumption rating for each of the combinations of the outlet temperature and the power consumption associated with the outside temperature corresponding to the current outside temperature detected by the detector, the comfort rating increasing with an increase in the outlet temperature and the power consumption rating increasing with a decrease in the power consumption;

calculate an overall rating for each of the combinations of the outlet temperature and the power consumption, by adding the comfort rating and the power consumption rating; and select, as the second temperature, an outlet temperature from the information stored in the memory, the selected outlet temperature being based upon a combination having a highest overall rating of the calculated overall ratings for each of the combinations.

17. The heating system according to claim 14, further comprising:

a room temperature detector configured to detect, on the per unit time basis, the room temperature of the room in which the radiator is installed, wherein the operation controller is configured to reduce the temperature of the heated water exiting the heat pump by a first amount when a unit time decrease in the temperature of the room detected by the room temperature detector is less than or equal to a second threshold.

18. The heating system according to claim 17, wherein the operation controller is configured to increase the temperature of the heated water exiting the heat pump by a second amount when the unit time decrease in the temperature of the room detected by the room temperature detector exceeds a third threshold, the second amount being less than the first amount and the third threshold being greater than or equal to the second threshold.

19. The heating system according to claim 14, further comprising:

a heating device including the heat pump, the radiator, and a heat pump controller that is configured to control the heat pump according to an operation condition transmitted from the operation controller; and a heating system controller, which is structurally separate from the heating device and includes the communicator and the operation controller.

* * * * *